United States Patent

Moore

[11] 3,883,693

[45] May 13, 1975

[54] DIGITAL COMMUNICATION SYSTEM

[75] Inventor: Clarence J. Moore, Philadelphia, Pa.

[73] Assignee: Applied Information Industries, Moorestown, N.J.

[22] Filed: July 11, 1972

[21] Appl. No.: 270,649

[52] U.S. Cl. .......... 179/15 AL

[51] Int. Cl. .......... H04j 3/08

[58] Field of Search .......... 179/15 AL

[56] References Cited

UNITED STATES PATENTS

| | | | |
|---|---|---|---|
| 3,731,002 | 5/1973 | Pierce | 179/15 AL |
| 3,732,374 | 5/1973 | Rocher et al | 179/15 AL |
| 3,749,845 | 7/1973 | Fraser | 179/15 AL |

*Primary Examiner*—Ralph D. Blakeslee
*Attorney, Agent, or Firm*—Morton C. Jacobs

[57] ABSTRACT

A time division multiplex communication system uses a signal path in the form of cable loops along which terminals for digital data or for voice communication (e.g., telephone hand sets) are coupled at convenient points. A controller for each path has a memory for storing at allocated locations the digital addresses of each pair of linked terminals, together with digital words to be transmitted (e.g., digitized voice samples) that were developed at the linked terminals. At a certain time period, the controller transmits a signal message containing a terminal address and a digital word via the path, so that the addressed terminal recognizes its own address and accepts the digital word (and, if a voice sample, converts it back to an audio signal for operating its telephone receiver). In response, the terminal sends a digital reply message which is stored by the controller until the time period for sending it to the other linked terminal.

12 Claims, 18 Drawing Figures

DIGITAL COMMUNICATION SYSTEM

BACKGROUND OF THE INVENTION

This invention relates to a multiplex communication system for digital signals.

In digital communication and in intercom and telephone systems incorporating many terminals, each installation of a terminal tends to be different and may require individual wiring to each such terminal, and to different numbers of terminals. Where there are a large number of terminals, the installation wiring may be quite complex and costly, and any change in location of terminals may require extensive rewiring. In addition, many types of installation (such as hospitals, ships, factories, building complexes) require a communication system to handle a variety of digital and voice and other analog signals. Terminals and the overall system should desirably be adaptable to connect equipments for such different signals and in a variety of mixes for two-way communication.

SUMMARY OF THE INVENTION

It is among the objects of this invention to provide a new and improved digital communication system.

Another object is to provide a new and improved digital communication system suitable for voice or other analog signals.

Another object is to provide a new and improved multi-terminal digital communication system whereby installation wiring to the terminals may be relatively simple.

Another object is to provide a new and improved multi-terminal digital communication system using a loop signal path to which many terminals may be readily coupled at various points along the path with no additional rewiring.

In accordance with one emobdiment of this invention, a digital communication system suitable for PBX and intercom applications having a large number of terminals employs a single signal path to which are connected all of the terminals to be linked for intercommunication. This path may be formed as transmit and receive loops to which a loop controller and the terminals are connected. The loop controller includes a memory having storage locations containing the addresses of each pair of terminals which are "linked" and engaged in interchange of digital messages, together with a digital message word (e.g., a digitized word or voice sample) being sent from one terminal to the other. In operation, one terminal transmits a digital word and the word is stored in the memory of the loop controller at the location assigned to the linked pair. At a time period assigned for transmission to the other terminal, the stored digital word is transmitted by the loop controller onto the receive loop, together with the address of the other terminal to which it is linked. The other terminal recognizes its address which accompanies the digital word on the receive loop, and accepts it (and, if a voice sample, converts it to an analog voice signal for operation of a speaker or telephone receiver). The other terminal also operates to generate a reply message in the form of a digital word (e.g., it digitizes a sampled voice signal picked up by a microphone) which is transmitted back to the loop controller on the transmit loop. The controller again stores that reply message word until a time period assigned for transmission to the first terminal, whereupon it is sent out onto the receive loop with the address of the first terminal. The latter terminal accepts the message word addressed to it, and in response thereto also sends out the next digital word. This operation may be repeated at a sufficiently high rate for maintenance of voice telephone communication. When one terminal calls another terminal, a stored program computer which supervises the calling operation establishes in the loop controller the memory locations in which the addresses of the caller and callee terminals are stored, and also establishes the respective time periods in which the two terminals transmit and receive words via the loops.

BRIEF DESCRIPTION OF THE DRAWING

The foregoing and other objects of this invention, the various features thereof, as well as the invention itself, will be more fully understood from the following description, when read together with the accompanying drawing, in which.

In the drawing, corresponding parts are referenced throughout by similar numerals.

DESCRIPTION OF A PREFERRED EMBODIMENT

Figure 1:
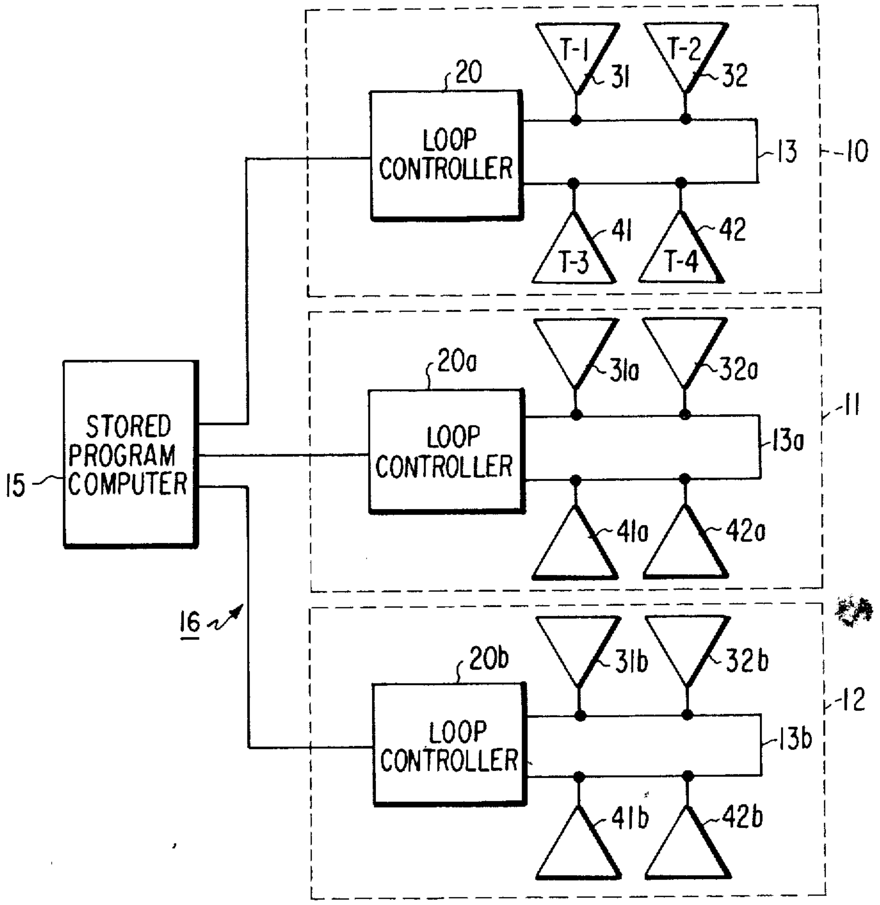
FIG. 1 is a schematic block diagram of a digital communication system embodying this invention.

A communication system 16 with three similar subsystems or loops 10, 11 and 12 is shown in block diagram form in FIG. 1. In one form, each sub-system may be an intercom loop for voice communication, though various digital and analog signal equipments may also be used in addition. Within each sub-system, a communication signal path 13, 13*a*, 13*b* is connected to a respective loop controller 20, 20*a*, 20*b*. The following description of loop 10 applies equally to the others. Connected to the signal path 13 are a plurality of digital message terminals 31, 32, 41, 42, which terminals may take various digital forms and in a particular embodiment illustrated in the drawing may be voice terminals adapted for sampling and digitizing the voice signals. An illustrative terminal 41 (shown in FIG. 2) incorporates the features common to all terminals used for two-way communication. By way of example, in one form of the invention, 100 such terminals may be connected to each signal path, with provision made for about 20 (or more) concurrent conversations. Loops 11 and 12 are generally the same as loop 10, though the number of terminals and their locations may vary in each loop. The controller of each loop is connected to a stored program computer 15, which affords overall supervisory control for the sytem.

Loop 10 operates within the system to establish a communication link between any two terminals (e.g., 31 and 32) connected to its loop signal path 13 in response to control signals generated at the respective terminals. The loop controller 20 receives voice samples in digital signal form from the terminals connected to the loop, and in certain time relations or slots. The controller temporarily stores the received digital voice samples in a memory along with digital addresses of the linked terminals, and the controller subsequently transmits said voice samples to the terminals connected to the loop, along with the terminal addresses, so that only the addressed terminal accepts the voice samples directed to it. The loop controller transmits the signals using, in effect, a time division multiplex technique, in which the digital signals transmitted to the particular linked terminals are assigned a certain time relationship in accordance with command signals generated by stored program computer 15. Once the time relations or slots of transmission of a caller and callee terminal are established, the two terminals are effectively linked by the transmission time slots, the temporary memory storage and the addressing of the terminals. The time slots for each linked pair of terminals are assigned in forming the communication link. In one embodiment, this assignment is performed by a selective allocation of memory locations for storage of the voice samples from the terminals being linked, together with a certain time sequence of transmission of the contents of those memory locations.

The stored program computer 15 is effective to establish supervisory control over the plurality of terminals connected to each signal path 13. Such control is effected by a first scan of the respective terminals to determine the indicated call pattern among the terminals, and a subsequent issuance of a command to the respective loop controllers to provide the indicated terminal linkage and to provide the time relationship to be followed in the respective loop transmissions. These stored program computer operations are repetitively performed throughout the duration of the system operation. A detailed description of system operation and components is provided below.

Terminal Description and Operation

Each terminal 41 provides the capability to transmit and receive voice or other analog signals and, in addition, certain control signals. When used for voice, each terminal includes audio transducers such as a microphone and loud speaker or hand set equivalents.

Figures 8, 10:
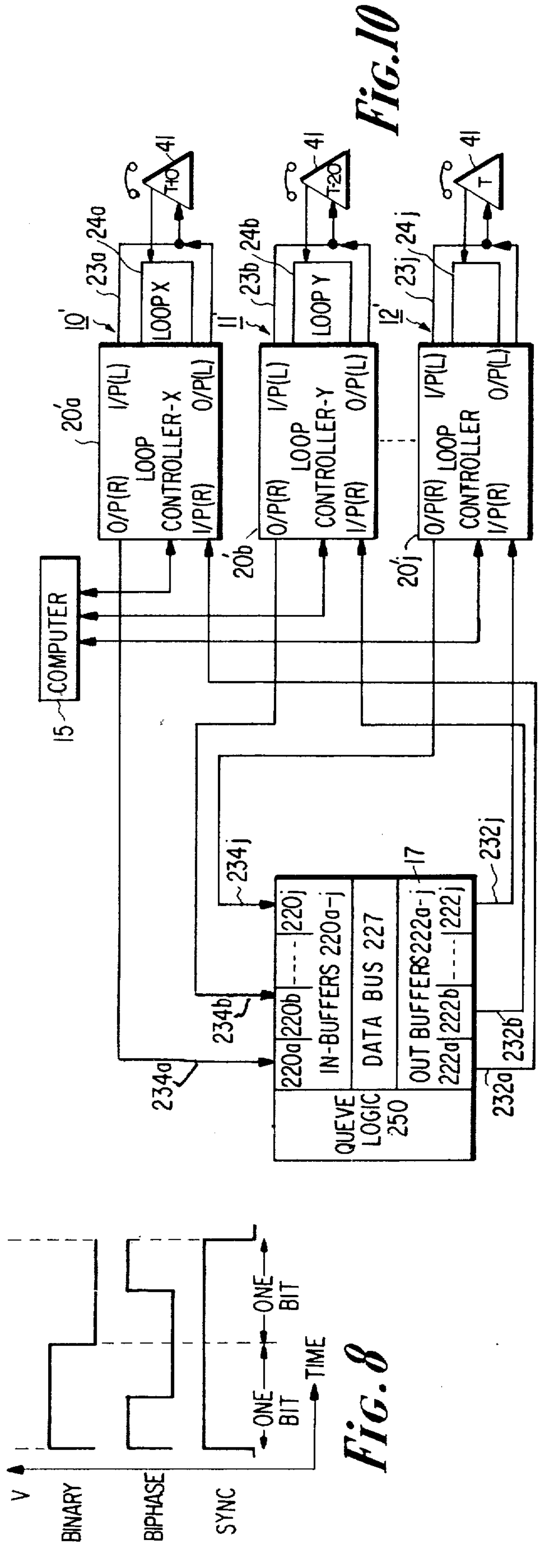
FIG. 8 is an idealized diagram of one form of synchronizing and data signals that may be used on the loop.
FIG. 10 is a schematic block diagram of a modified form of the system in which there is communication between terminals in different loops.

The digital signals which are transmitted from the terminal on loop 24, and which are received by the terminal from loop 23, may take various suitable forms. One form is a biphase construction as shown in FIG. 8A. A data bit 0 is represented by a negative excursion for a half-bit period, followed by a positive excursion for the second half-bit period. A data bit 1 is represented by the reverse order of half-bit excursions. Differentiation between a data bit of 0 and 1 is made by detecting the sense of the 180°change in phase of the transmitted signal. The biphase format is fairly simple for clocking and has a low error rate. The synchronizing signal has a positive excursion equal in length to two bit periods, and is thus distinguishable from any other data in the transmission. The format of binary signals used in the various logic circuits is also shown in FIG. 8.

Figure 7A:
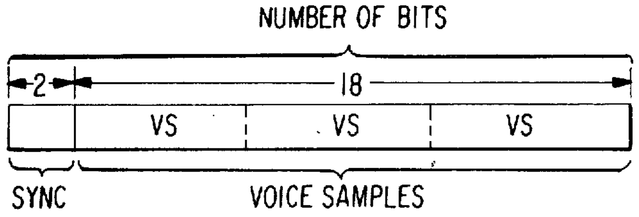
FIGS. 7A and B are idealized graphical diagrams of a word format for transmit and receive signals used in the system of FIG. 1.
Figure 7B:
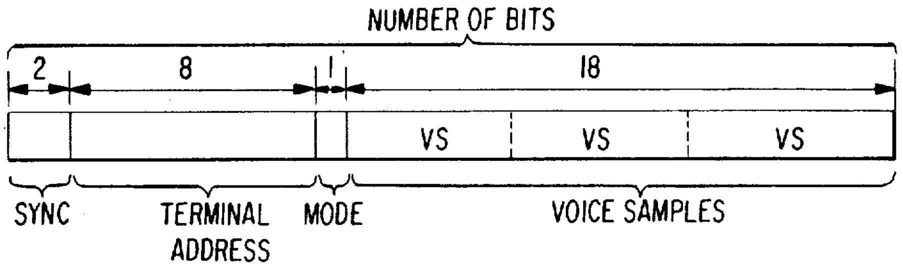

The digital signals which are transmitted from terminal 41 on terminal transmit loop 24, in one embodiment, are of a certain length (e.g. 20 bits), having the following format (FIG. 7A): a sync signal (e.g. 2 bits) and voice sample or control signal (e.g. 18 bits). The digital signals that are received by terminal 41 on terminal receive loop 23 are also of a certain length (e.g. 29 bits), having the following format (FIG. 7B): sync signal (e.g. 2 bits), terminal address (e.g 8 bits), mode signal (e.g. 1 bit), and three digital voice samples (e.g., each having 6 bits). The formats of FIG. 7 are illustrative; the number of voice samples can vary, for example, as a trade-off between the data rate on the loop and the length of the storage registers in the terminals.

Each terminal 31, 32, 41, 42 (FIG. 2) is divided into transmit section 43 and receive section 44, indicated diagrammatically by broken-line boxes. The receive section 44 of each terminal is connected to terminal receive loop 23 at input terminal 60. The signals at terminal 60 are applied, via line interface 79, to sync detector 61 and, via biphase to binary converter 77, to address detector 62, mode detector 63, a first and a second receive register 65 and 66, and also to a timing generator 56 of transmit section 43. The output of sync detector 61 is connected to the enabling input terminal of address detector 62, whose output, in turn, is connected via line 64 to transmit-initiate generator 57 in transmit section 43 to establish the proper time relation of the next transmitted word, and also to the enabling input terminal in mode detector 63. Mode detector 63 supplies the enabling input signals to registers 52 and 66, via line 58, or, depending upon the mode signals, to registers 51 and 65 via line 53. The output of receive register 66 is connected via a decoder 67 to the select gates 50 in transmit section 43, and to a lamp display 73 to indicate the control status. The output of receive register 65 is connected to a suitable digital to analog converter 68 which, in turn, provides the input signal to amplifier 70, which drives loud speaker 71.

In operation, receive section 44 is effective to operate on a digital signal message received from terminal receive loop 23 in a manner so as to detect in that signal the synchronization bit pair by means of sync detector 61. Following detection of the sync bit pair, address detector 62 is enabled to compare and recognize if the received signal message on line 60 contains a predetermined address bit pattern (the address may be wired into each terminal for this comparison and for transfer back to the loop controller and processor under certain control operations). Upon recognition of the particular terminal's associated address pattern, its mode detector 63 is enabled to determine the sense of a mode bit in the received message. Receive section 44 acts in accordance with such determination of the sense of the mode bit to store the received digital control signals in register 66 and enable a transmission from register 52; or alternatively, store the received digital voice sample in register 65 and enable a voice transmission from register 51. Where the mode bit indicates a control mode, the said digital control signals are established in register 66, and the latter is used via decoder 67 to operate select gates 50 in transmit section 43, which determines which of the control inputs is transmitted. In the case where said digital voice sample is established in register 65, said sample is converted from digital to analog form in converter 68. The analog signal at receive output terminal 69 represents the reconstituted voice signal originating at the linked terminal. This signal is amplified to drive loud speaker 71. When the terminal's address is recognized, a command signal is supplied via line 64 to the transmit-initiate generator 57, in order to prepare for the subsequent return transmission to the controller 20. When the transmit-initiate generator 57 is signalled via line 64, it immediately starts the transmission of the digital signals as described below.

The transmit section 43 of each terminal comprises a voice signal input microphone 38 (or a suitable input for other analog signals) connected to an amplifier 39. The output of amplifier 39 is connected to a suitable analog to digital converter 49, which may be of any suitable form to sample the voice signal and convert it to a digital word. The converter output, in turn, is connected to a first transmit register 51. A control signal device 46 such as a keyboard (for entry of data for control or computer updating) and various status switches 45 at respective input terminals 47 and 48 are connected to a second transmit register 52 via select gates 50, one of which is enabled by a decoder 67 in the receive section 44. Enabling input signals to registers 51 and 52 are supplied via lines 53 and 58 respectively from mode detector 63 in the receive section. The outputs of registers 51 and 52 are connected to the signal inputs of transmit gate 55, which receives enabling inputs from timing generator 56 and from transmit-initiate generator 57. The initial sync portion of the transmitted word is supplied to the line interface 78 by a sync generator 54 operated in proper time relation by transmit-initiate generator 57. The signals passed by transmit gate 55 are applied via binary to biphase converter 76 and line interface 78 and output terminal 59 to terminal transmit loop 24.

In operation, transmit section 43 is effective to digitize an analog input signal such as a voice signal from microphone 38. The analog signal applied to converter 49 is processed in said converter in a known manner such that the signal is repetitively sampled at a frequency twice the bandwidth, the sampled value held in short term storage within converter 49, and finally converted by any suitable process to digital form corresponding to the value of the analog signal sample. The resultant digital signal is stored in register 51. Alternatively, on command, control input signals from status switches 45 or keyboard 46 (such as a request for the establishment of a communication link with another terminal or its telephone number) are stored directly in register 52.

The sync signals from generator 54 and the stored signals in either register 51 or 52 are gated through one of the transmit gates 55 in proper time relation in response to command signals from transmit-initiate generator 57 and synchronously with a timing signal from timing generator 56. The signals passed by gate 55 are applied via converter 76 and interface 78, which may include suitable digital signal shaping circuits, to output terminal 59 and to terminal transmit loop 24.

The voice or data transmit register 51, the control transmit register 52, the select gates 50, and the transmit gates 55 may be made of standard logic elements in integrated circuit packages. The timing generator 56 consists of a crystal oscillator and count down chains and several phases which permits synchronizing the terminal logic to the line rate; it automatically generates the proper bit spacing. The sync generator 54 creates a positive DC pulse 2 bit lengths in width for application to the line interface 78. The binary to biphase converter 76 contains suitable digital logic to create the output square wave pulses (FIG. 8) as required by the 1 or 0 state of its input control wire. The line interface 78 contains amplification, filters, wave shaping networks and a high impedance connection to transmit loop 24.

The line interface circuit 79 contains a high impedence connection to receive loop 23, amplifier and pulse shaping network to provide a square wave output to the biphase to binary converter and sync detector. The sync detector 61 contains digital circuitry designed to detect the special synchronizing wave shape. The biphase to binary converter 77 contains digital logic to convert the received signals into binary form. The address detector 62, mode detector 63, control receive register 66, voice or data receiver register 65, and the decode network 67 all may be formed of standard digital logic circuits in integrated circuit form.

Loop Controller Description and Operation

Figure 3:
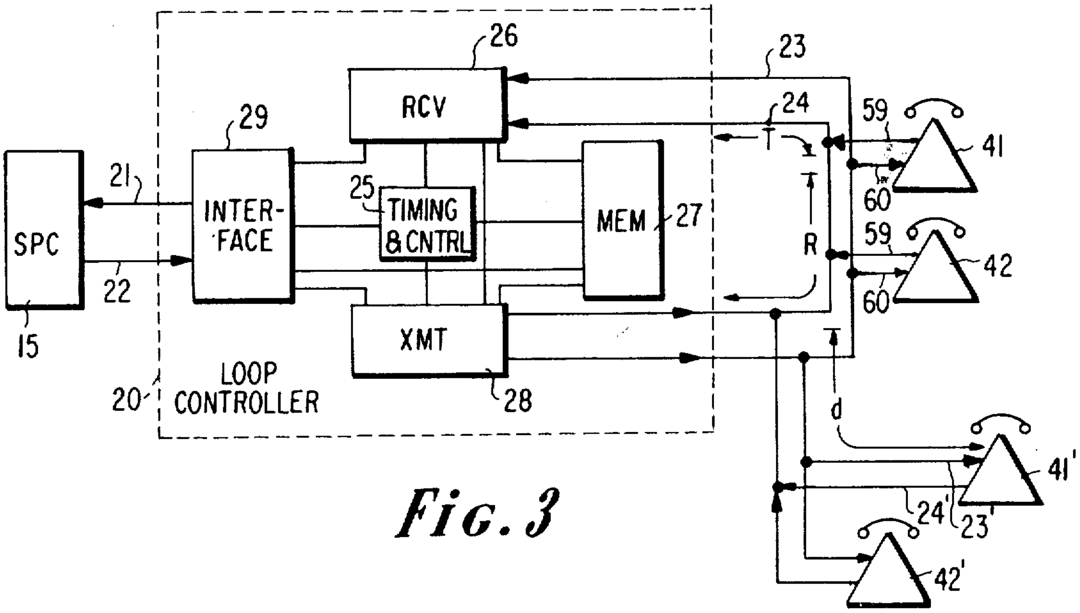
FIG. 3 is a schematic block diagram of a loop controller used in the system of FIG. 1.
Figure 4:
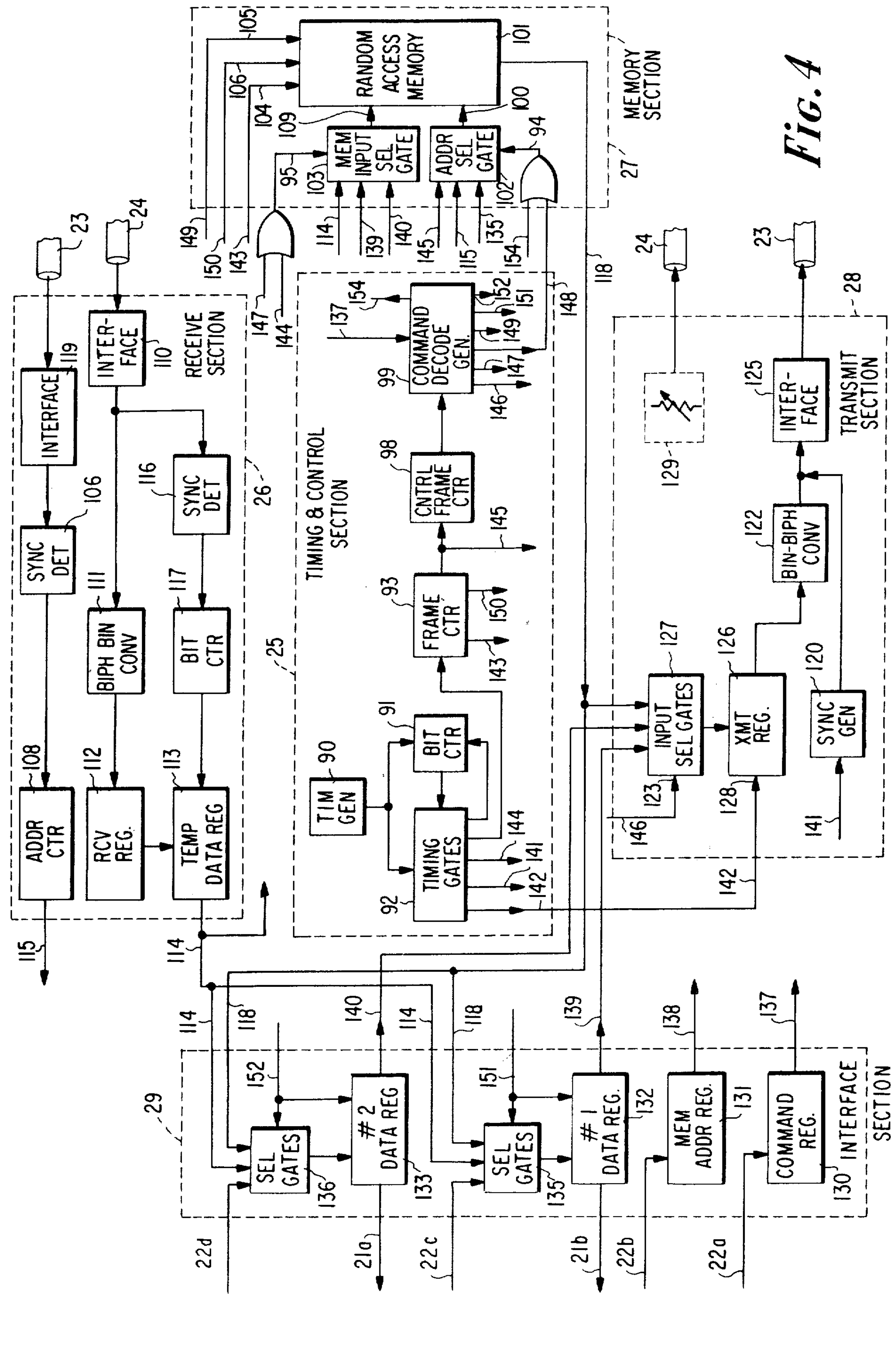
FIG. 4 is a schematic block diagram of details of various parts of the loop controller of FIG. 3.

Loop controller 20 is shown in FIG. 3 in block diagram form with interconnections to stored program computer 15 and to two terminals 41 and 42, by way of example. Loop controller 20 comprises timing and control section 25, receive section 26, memory section 27, transmit section 28, and interface section 29 (FIG. 4). Each of the sections within the loop controller is interconnected with each of the other sections. These sections and the interconnections are more particularly described hereinbelow. Cables 21 and 22 provide connections between interface section 29 and stored program computer 15. Terminal receive loop 23 and terminal transmit loop 24 form the signal path 13 that is connected between the transmit section 28 and receive section 26 of loop controller 20. As shown in FIG. 3, terminals 41 and 42 have their respective input terminals 60 connected with terminal receive loop 23, and their output terminals 59 respectively connected to terminal transmit loop 24. The loops 23 and 24 may be individual transmission lines such as coaxial cables or twin pairs connected between the transmit and receive sections 28 and 26 and extending in any convenient way around a facility such as a building. The terminals are connected to the cables at any convenient points.

The memory section 27 includes a random access memory with sufficient storage locations or words for the number of linked terminal pairs in conversation (e.g., 19 words of 42 bits each in one embodiment for 19 conversations maximum, and more such words in other embodiments). Each storage word is used to associate a pair of terminals which are linked and form part of the communication path between the terminals. In addition, each word provides temporary storage for digital voice samples in transit between the linked terminal pair. The format for a memory word linking terminals A and B is as follows (FIG. 6): an initial group of unused bits (e.g.·, 4), the terminal A address (e.g. 8 bits), another group of unusec bits (e.g. 4), the terminal B address (e.g. 8 bits), the message section (e.g., three voice samples A to B or B to A each having 6 bits).

In general terms, loop operation is controlled by the loop controller in the following manner. Stored program computer 15, through interconnections 21 and 22, interface section 29 and transmit section 28, interrogates sequentially the terminals connected to terminal receive loop 23. This interrogation is performed during a time slot in the time division multiplex cycle dedicated to this supervisory activity of the SPC 15. The respective terminals, by way of terminal transmit loop 24, receive section 26 and interface section 29, respond with control signals to the SPC 15, which indicates a desired call pattern among the terminals. SPC 15 is then effective through the interface section 29 to establish a communication link between respective terminals having so indicated a desire to be linked. A communication linkage is established between a pair of terminals by an allocation of a storage word of memory section 27 to be associated with said pair of terminals, and by inserting in that storage word the addresses of the two terminals. Loop controller 20 operates in response to timing signals generated in timing and control section 25, and sequences through the series of terminal linkages established in memory section 27.

In a certain time period established by timing and control section 25, transmit section 28 is effective to transmit on terminal receive loop 23 a signal message for a particular communication link, which message comprises an address (corresponding to the intended terminal) and a voice sample transmitted signal from the other terminal, as shown in FIG. 7B. The addressed terminal recognizes its own address and accepts the associated voice sample of the message and, at a predetermined time following the receipt of a voice sample, is effective to transmit on terminal transmit loop 24 a reply message which includes a voice sample intended for the linked terminal. This reply message is received at controller receive section 26 and stored in the corresponding portion of memory section 27 allocated for the communication link between said pair of terminals. Loop controller 20, under the control of timing and control section 25, continuously cycles through the communication links set up in memory section 27. In addition, at certain predetermined time periods, stored program computer 15 regularly interrogates all the terminals connected to loops 23 and 24 to establish an update in the memory section 27 of the call pattern indicated by those terminals. That is, it links the terminals as requested by establishing their addresses in a memory word, and disconnects terminals upon completion of the conversations by erasing those addresses.

A more detailed description of the operation of the loop controller blocks (FIG. 4) is as follows.

1. *Receive Section* 26 is effective to receive the digital message (e.g. biphase signals) transmitted by each terminal 41 and 42 on terminal-transmit loop 24, convert said signals to binary form, and provide temporary storage of those signals. Receive section 26 further is connected to terminal-receive loop 23 and provides memory address update signals for the memory section 27, which are derived from the signals on loop 23 that were transmitted by the transmit section 28.

Line interface 110 receives the transmitted signals generated by terminals 41 and 42 on terminal-transmit loop 24. The output of interface 110 is connected to sync detector 116 and biphase-to-binary converter 111. Converter 111 provides a serial binary signal which is stored in receive data register 112. The data register 112 is connected for parallel transfer from it of the information (with the sync bits removed) to temporary data register 113. The output of sync detector 116 is connected to the receive bit counter 117 to cause the counting of bits in the received message. Counter 117 provides an output signal when the proper number of bits are received, which is applied to temporary data register 113 at the appropriate input to initiate the parallel transfer of the data from register 112 to register 113. The output 114 of data register 113 is connected to memory input select gate 103 in memory section 27 and input select gates 135 and 136 in interface section 29.

The terminating end of the terminal receive loop 23 is connected (via a line interface 119) to sync detector 106, whose output is connected to actuate receive address counter 108. The output 115 of counter 108 is applied to memory address select gate 102 in memory section 27.

2. *Memory Section* 27 provides long-term storage of the addresses of linked terminals and the messages therebetween. The memory section 27 comprises a random access memory 101 (e.g., an MOS memory) having an address select input 100, first, second and third read inputs 104, 105 and 106, and write input 109. The different read inputs 104, 105 and 106 permits reading out of different portions of the addressed memory word. Signals applied to address input 100 are generated by memory address select gate 102. Memory address signals are applied to gate 102 from the frame counter 93 in timing and control section 25, from output 115 of the receive address detector 108 in receive section 26 and memory address register 131 in interface section 29. The gate is enabled at input 94 by means of a signal applied by way of command-decode generator 99 in timing and control section 25.

Read inputs 104 and 106 are driven by signals generated on lines 143 and 150, respectively, by frame counter 93. Read input 105 is driven by a signal generated on line 149 by command-decode generator 99. Write input 109 is driven by signals passed by memory input select gate 103, which receives data signals from temporary data register 113 in receive section 26, and from data regosters 132 and 133 in interface section 29. Gate 103 is enabled via input 95 by a signal generated on line 147 by command-decode benerator 99, or on line 144 by timing gate 92 in timing and control section 25. The output of memory 101 is connected by line 118 to input select gate 127 in transmit section 28, and to input select gates 135 and 136 in interface section 29.

Figure 6:
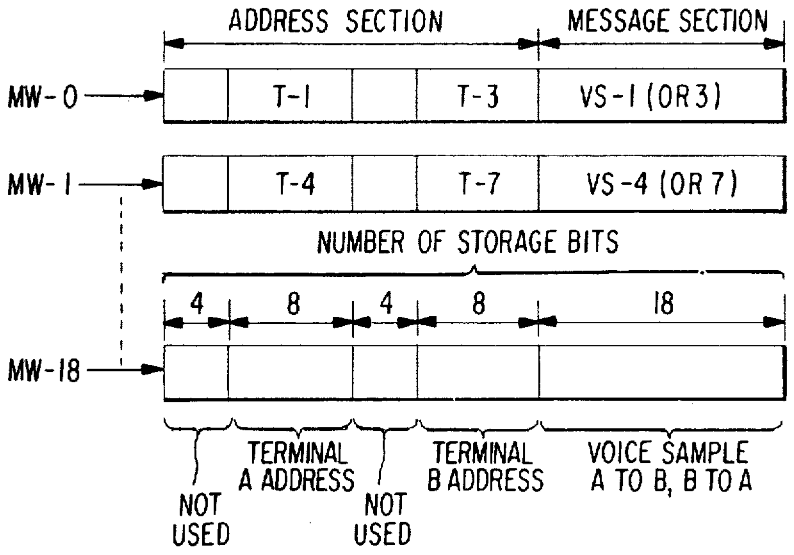
FIG. 6 is a schematic diagram mapping the contents of the memory for two pairs of linked terminals in the system of FIG. 1, and showing the sub-sections of each memory word.

The format of data stored in memory 101 is shown in FIG. 6. The controls are arranged so that selected parts of each word can be read out as required by the operation.

3. *Transmit Section* 28 is effective to construct and transmit the loop controller output messages to the terminals 41 and 42. The messages comprise a sync bit pattern, a terminal address, a mode bit and data (e.g., a digital voice sample) or control signals selected from memory section 27 or interface section 29. The mode bit is 0 when signals are selected from memory section 27, and is 1 when signals are selected from interface section 29.

Transmit input select gate 127 has two sets of parallel input terminals, which sets are connected respectively to the output lines 118 of memory 101 in memory section 27 and to output lines 139 and 140 of data registers 132 and 133 in interface section 29. The appropriate input signal is selected in response to a signal applied to select input 123 of gate 127 from line 146 of command-decode generator 99. The output of gate 127 is transferred in parallel to transmit register 126. A series of timing pulses, applied by way of output 142 of timing gate 92, are applied to serial timing input 128 of register 126 and are effective to serially read out the contents of that register 126. The output of register 126 is connected to the binary-to-biphase converter 122 which, in turn, is connected to line interface 125. A timing signal on line 141 from timing gate 92 is applied to sync generator 120, whose output is connected to line interface 121. The output of interface 125 is the signal which is applied to terminal receive loop 23. Transmit section 28 also comprises an impedance matching termination 129 for transmit loop 24.

4. *Interface Section* 29 is comprised primarily of four storage registers providing for temporary storage and transfer of digital signals between stored program computer 15 and loop controller 20.

Command register 130 is provided with a data input connected via line 22*a* from stored program computer 15. Signals applied to this terminal are entered in storage in command register 130 in response to control signals from the stored program computer 15 via line 22*a*. The output 137 of command register 130 is connected to the command-decode generator 99.

Memory address register 131 has a parallel digital signal input via lines 22*b* from stored program computer 15. The signals applied to this input are stored in register 131 in response to control signals from the stored program computer. The output 138 of memory address register 131 is connected to memory address select gate 102. Data register 132 has parallel input data connections supplied by input select gate 135. Gate 135 has three sets of parallel input connections, a first set of lines 22*c* from stored program computer 15, a second set 114 from temporary data register 113 in receive section 26, and a third set 118 from memory 101. One of these sets of inputs is selected to appear at the output of gate 135 in response to a signal applied to gate 135 on line 151 from command-decode generator 99 and control signals from the computer 15. The output signal from gate 135 is stored in data register 132 in response to a signal applied to register 132 from command-decode generator 99. The output 139 of register 132 is connected to memory input select gate 103, and to transmit input select gate 127, and via line 21*b* to the stored program computer.

Data register 133 is generally the same as data register 132, having input select gate 136 to provide the appropriately selected input signal from parallel line sets 114, 118 or 22*d* to register 133. The appropriate signal is similarly selected in response to a signal on line 152 from command-decode generator 99. The output 140 of register 133 is also connected to memory input select gate 103 and to transmit input select gate 127, and via line 21*a* to the stored program computer. Except during the control frame (e.g., frame 35 discussed hereinafter), information is transferred between interface section 29 and the stored program computer 15 via cables 21 and 22. The stored program computer 15 may request one of three commands by an appropriate bit configuration transferred into the command register 130. The commands are: write memory, read memory, and interrogate terminal. During the control frame (e.g. frame 35), the command-decode logic 99 in the timing and control section 25 generates command signals to direct the order in the command register to be performed (e.g., for a "write memory" command the contents of data register 1 and data register 2 are caused to be written into the memory by input select gate 103 addressed by the contents of the memory address register 131 via the address select gate 102). 5. *Timing and Control Section* 25 provides the basic clock timing signals used by the loop controller in loop operation. In addition, certain control signals generated by computer 15 are decoded and transformed into local control signals for operation within the loop controller.

Timing generator 90 is effective to generate a predetermined frequency clock signal by a suitable oscillator. The output of generator 90 is connected to transmit bit counter 91 and to timing gates 92. Counter 91 is connected to gates 92 to provide enabling signals to those gates at appropriate counts. Outputs of gates 92 are, in turn, connected to frame counter 91 and further to sync generator 120 via line 141 and to transmit register 126 via line 142, and are also connected to the reset input of counter 91, and to the enable input of memory input select gate 103.

Frame counter 93 cycles through the frame count and back to 0 and provides a signal for control frame detector 98, and via line 145 for memory address select gate 102 and further via lines 143 and 150 for read inputs 104 and 106 of random access memory 101. Frame detector 98 supplies the enabling signal on frame 35 to command-decode generator 99, which receives data inputs from command register 130 in interface section 29. Command-decode generator 99 provides output signals to transmit input select gate 127 via line 146, to memory input select gate 103 via line 147, to memory address select gate 102 via line 148, and to memory read input 105 via line 149, and via lines 151 and 152 to interface input select gates 135 and 136.

6. *Loop Controller Operation* . The loop controller 20 controls basic communications operations within a given loop 10. Such operations are shown in graphic form in FIG. 5, setting forth the multiplex interlace scheme for an illustrative 40-frame system, with two conversations being illustrated. The conversations are between two sets of terminals 41 and 42 designated in FIG. 5 as T-1 and T-3 and T-4 and T-7, respectively.

Figure 5:
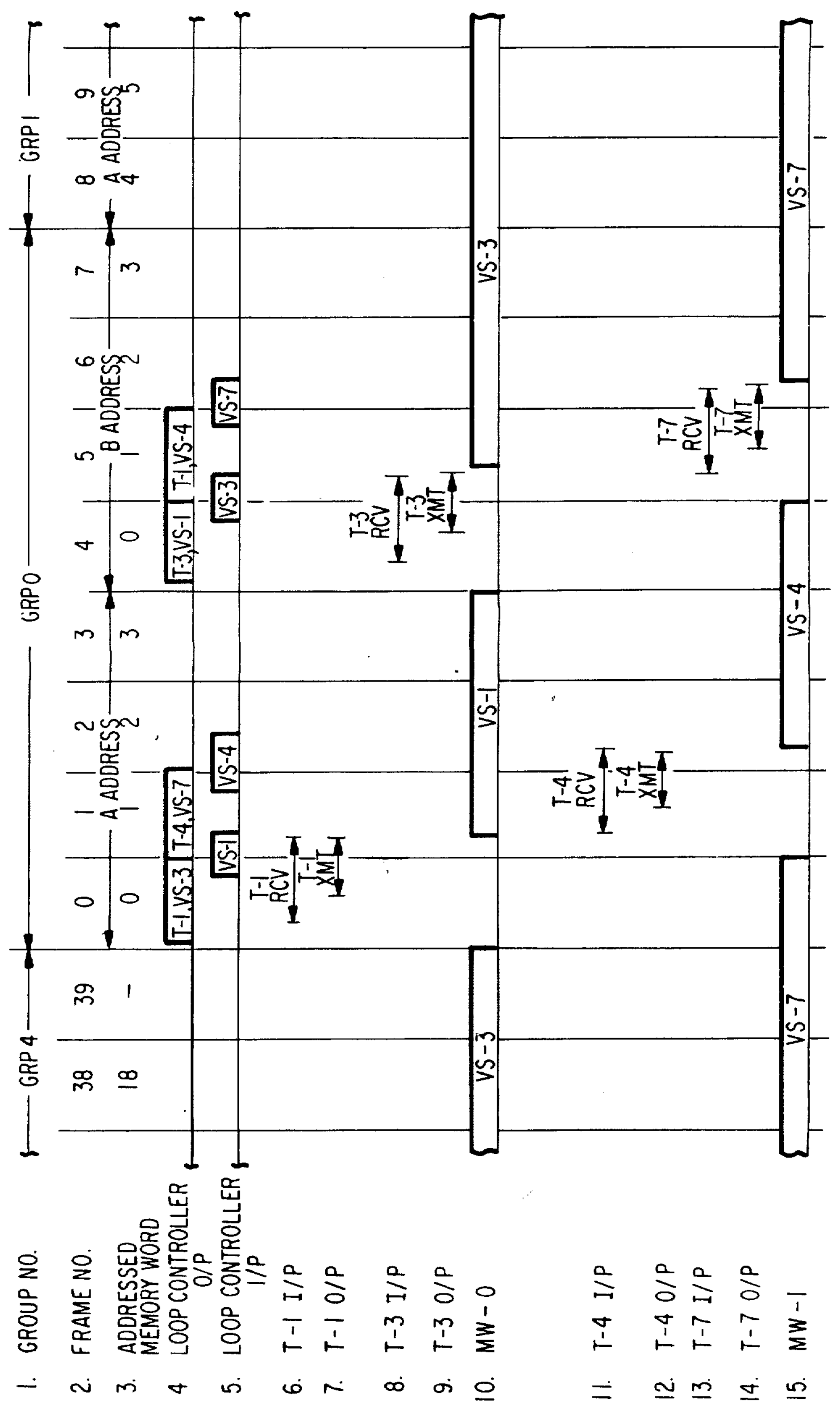
FIG. 5 is an idealized graphical diagram of time relationships of various operations performed in the terminal and loop controller of FIGS. 2 and 4.

Loop controller 20 operates on a cyclic basis. In this embodiment, cycle time period is divided into five group periods, each of which is assigned a number for reference purposes from 1 through 5 (FIG. 5, line 1). Each of the five group periods is further subdivided into eight frame periods, five groups of eight frames (or 40 frames) per cycle of loop controller operation, each of which is numbered for reference purposes from 0 through 39 (FIG. 5, line 2) and is established by frame counter 93. In addition, each group is divided into two parts corresponding to the operation of the A or B address being read from the memory; that is, during the first four frames of each group of frames, the A address is read out, and during the second four frames, the B address. The timing and control section is constructed to provide the appropriate control signals.

The random access memory 101 of the loop controller comprises nineteen storage locations, called memory words, serially numbered for reference purposes from 0 through 18 and designated MW-0 through MW-18, respectively (FIG. 6). The contents of each memory word, as shown in FIG. 6, reflect the two conversations described with reference to FIG. 5.

During each frame period, the loop controller 20 is effective to "address" (in a manner described below) a particular memory word. During each group period, four consecutively numbered memory words are addressed, one per frame period, during the first four successive frame periods and, thereafter, this process is repeated during the second four successive frame periods within the group period. For successive group periods, the entire memory word addressing process as thus described is repeated for the next four consecutively numbered memory words. Thus, during frame periods 0 through 7, memory words MW-0 through MW-3 are successively addressed a first and a second time. Similarly, during frame periods 8 through 15, memory words MW-4 through MW-7 are so addressed, and so on, except that memory words are not used during frames 35 and 39. Line 3 of FIG. 5 shows the number of the addressed memory word for the first ten frames of a loop controller cycle. During each successive group, the corresponding next four consecutive memory words are similarly addressed, so that by the end of frame 38, all 19 memory words will have been addressed two times. During one of those two times, the first of the terminal addresses is read for A-terminal service, and the other or second terminal address is read for B-terminal service.

A loop controller 20 output signal configuration is indicated in line 4 of FIG. 5. During each frame period, a digital message is transmitted from the loop controller 24 to a terminal 41 or 42, via terminal receive loop 23, which message is constructed from the memory word interrogated during the particular frame period. Each message is prefixed by a digitally coded address portion corresponding to the address of the terminal for which is intended an attached second digitally coded voice sample or message originating from the terminal linked with the addressed terminal.

In the conversation mode of operation, the prefixed digital address is comprised of either the A or B stored terminal address portion of a memory word (FIG. 6), alternately selected on the first and the second addressing of a memory word. Each terminal is effective to selectively accept only messages bearing the terminal's address. In FIG. 5 (line 4), the terminal addresses are represented by the letter T and the decimal number of the terminal to which the message is sent, and the voice sample message is represented by the letters VS and a decimal number indicating the terminal of the message's origin. For example, in frame 0 the loop controller output signal is shown to contain address T-1, the address being selected from the A address portion of MW-0. The output signal further contains a voice sample VS-3 originating from terminal T-3. In frame 4, a voice sample VS-1 from T-1 is addressed to T-3, selected from the B address portion of MW-0.

Line 6 of FIG. 5, designated T-1 I/P, shows the time period during which a first terminal 41, designated T-1, recognizes its own address in the message transmitted by loop controller 20. Line 7 of FIG. 5, designated T-1 O/P, shows T-1 transmitting a return communication signal from T-1 to loop controller 20 to be retransmitted to terminal T-3. The transmission of this voice sample VS-1 from T-1 starts immediately after the reception of the address and mode bits accompanying VS-3, and VS-1 is received in receive section 26 of loop controller 20 from terminal transmit loop 24 shortly thereafter (FIG. 5, line 5) to be stored (FIG. 5, line 10) in memory word MW-0. The reply VS-1 must be available in memory prior to the beginning of frame 4, during which time memory word MW-0 is to be next interrogated for read out (line 4) and its contents, VS-1, transmitted to T-3. The time at which the reply transmission for a terminal is received by the loop controller is determined by the delay length of the loop, but in no instance in this embodiment can the loop be so long as to produce a delay that exceeds three frame times after the transmission to the terminal by the controller.

During frame 4, the message contents Vs-1 of memory word MW-0 are transferred, together with the address of terminal T-3, from the B address portion of MW-0 to transmit register 126. Then that composite message in transmit register 126 (i.e., the address T-3 and voice sample VS-1), together with a sync signal (generated in sync generator 120) is transmitted on receive loop 23, at the time shown in line 4 of FIG. 5. As shown in line 8, the voice sample VS-1 is transmitted from loop controller 20 and received at input 60 of terminal T-3, approximately at the time period indicated, and in response thereto T-3 transmits its reply approximately as shown in line 9. The timing of this transmission is such that the transmitted signal is stored in memory word MW-0, as depicted in line 10. Since memory word MW-0 is not addressed again for some 34 frames (as shown in lines 2 and 3), memory word MW-0 is effective to store the voice sample VS-3 through frame 39 of the loop controller operation. During frame 0 (which follows frame 39), the address of terminal T-1, together with the voice sample VS-3, is transferred to transmit register 126. Then the signal from transmit register 126, together with a sync signal (from sync generator 120) is transmitted at the loop controller output on receive loop 23, and the cycle repeats as described above.

Lines 11 through 15 show similar operations for a conversation between linked terminals T-4 and T-7, using memory word MW-1. The controller transmits VS-7 to T-4 during frame 1, and in response thereto T-4 replies with VS-4 and the reply message is stored in MW-1 prior to the end of frame 4, so that it is available for retransmission during frame 5. The controller transmits VS-4 to T-7 during frame 5, and in response thereto T-7 replies with the next VS-7 for storage in MW-1, and the cycle is repeated starting with the next frame 1.

Loop controller timing signals are generated in timing and control section 25. Generator 90 is effective to produce a continuous pattern of timing pulses at the system clock rate. Bit counter 91 is effective to monitor the timing generator 90 output signal, producing count output signals which are applied to timing gates 92. At the appropriate bit count signal, as developed by counter 91, gates 92 are effective to pass, via lines 141, 142 and 144, a predetermined number of timing pulses respectively to sync generator 120, to transmit register 126, and to enable input 95 of memory gates 103. Gates 92 also provide, in response to a bit count representative of a frame, a pulse to the reset input of counter 91 and a second pulse to frame counter 93. In this manner, frame counter 93 receives a pulse input following the completion of each frame, and the output is a frame count which is applied to memory address select gate 102, where such count signals are decoded in such a manner as to address or select the appropriate memory word corresponding to the particular frame count signal. Alternating frame count signals on lines 143 and 150 enable the read inputs 104 and 106 for read-out of the A and B addresses respectively. For example, during the period in which counter 93 indicates a binary count of 001001 (frame 9), the corresponding signal applied to select gate 102 is effective to cause gate 102 to address memory word MW-5 and, with an enable signal on line 143 to read input 104, to cause a read of the A address and the voice sample. Similarly, during the count for frame 13, the memory word MW-5 is again addressed, but the enable on line 150 to read input 106 (due to the third bit from the right in the frame count being a 1) causes a read of the B address and the voice sample. Control frame detector 98 is effective to detect the period when counter 93 indicates frame 35. At such a time, detector 09 is effective to enable command-decode generator 99, which, in turn, provides internal control signals for the loop controller in accordance with the particular command signal combination which had previously been stored in command register 130 of interface section 29.

During the conversational mode of operation, for example, as described above in a conversation between terminals T-1 and T-3, the timing pulses gated from gates 92 are effective to read out of memory 101 from the memory word as selected by the memory address select gate 102 and read select gate 104 (in response to the frame number applied by frame counter 93), the address of terminal T-1, the mode bit equal to zero, and the stored voice sample VS-3 during frame 1. Thus T-1 and VS-3 read out from memory 101 are supplied to transmit input select gate 127 and stored temporarily in transmit register 126. A two-pulse timing signal is applied from gate 92 to sync generator 120 which produces the sync signal (FIG. 7A). Following immediately thereafter, a second stream of timing pulses from gate 92 is applied to register 126 and is effective to serially read out the contents of register 126. The signals generated by register 126 are processed by converter 122 and interface 125 to produce the message of T-1 and VS-3, having a sync prefix which is applied to terminal receive loop 23 (FIG. 5, line 4).

The transmitted message on loop 23 is selectively accepted by terminal T-1 in response to that terminal's recognition of its address. That transmitted message is also received in loop controller receive section 26 where sync detector 106 is effective to detect the sync signal, and step the counter 108 to provide a memory address (via line 115 and select gates 102) for the next reply message received from the linked terminal on loop 24. The count in counter 108 lags the count of frame counter 93 by a certain amount corresponding to the transmission delay of the loop signal path, so that the reply message is stored in the same memory word that defines the linked terminal pair; in the illustrated embodiment this delay is less than three frames. Thus the reply message from T-1 is received by the controller (FIG. 5, line 5) before the end of frame 3 (as shown, during frame 1) and the memory address select gate is then effective to insure that the reply voice sample VS-1 received from terminal T-1 is stored in the proper memory word MW-O, as shown in line 10 of FIG. 5, so that it can be retransmitted in frame 4, the next time set for transmitting the contents of MW-O to T-3. That is, the reply message transmitted from terminal T-1 is applied to loop controller receive section 26 by way of terminal transmit loop 24, and, by means of sync detector 116, bit counter 117 and receive register 112, the voice sample VS-1 is stored in temporary date register 113, from which it is transferred via line 114 and memory input select gate 103 to the write input 109 of memory 101, in response to a timing signal from gate 92 applied to the gate 103 enable input. The sync-pulse count in receive-address counter 108 (which is the same form as frame count 93, and differs in count by the delay in transmission along the loops) then defines the address of memory word MW-0, which is selected by gate 102, so that the voice sample VS-1 is stored in the memory location MW-0 that maintains the linkage of terminals T-1 and T-3.

Each terminal is so located in its connections to the transmit and receive loops 23 and 24 as to provide an overall uniform delay in the time that it takes a mesage to travel from the loop controller to the terminal and the reply message to be returned to the loop controller (see FIG. 3). Thus, if the location of the connections 59 and 60 of a terminal 41 is such that the distance from the transmit section 28 of the controller to that terminal's input connection 60 along receive loop 23 is R, and the distance from that terminal's output connection 59 along the transmit loop 24 to the receive section 26 of the controller is T, then T + R is a constant for each terminal attached to the loop, which is called the overlap function. The signal transmit delay corresponding to this overlap function is used to determine the difference in address between that defined by the frame counter 93 in the loop controller (for reading out the memory and sending a message word to a terminal), and the address defined by receive address counter 108 (for identifying the address of the memory word into which the reply message word from that terminal is to be stored). This overlap function may be zero for very short lengths of signal paths, or it may be up to four frames for the embodiment illustrated in the graphical diagram of FIG. 5. For the parameters indicated above of message length and sampling rates, and 19 conversations between 38 link terminals in pairs, the loop length can be as much as 9000 feet. In addition, it is possible to connect the terminals by stub connections 23' and 24' some distance from the main signal path loops, as illustrated in FIG. 3. A separate stub connects each signal path to one or more terminals, and it is possible for the parameters indicated to have stub lengths $d$ that are up to about 400 feet. This distance of remote connection of the terminal from the main signal path is made possible by the reply message being shorter than the message from the controller that contains the terminal address. Thus the possible spacing between successive messages on the transmit loop 23 is greater than that on the receive loop 24, and this greater difference permits a greater tolerance in the location of the message words. This additional tolerance of location of the message words corresponds to the time delay of a message word traveling from the receive loop 23 along a stub 23' to terminal 41' and back along stub 24' to the transmit loop 24. Formulae for maximum loop and stub length for such systems are discussed below.

During frame 4, memory word MW-0 is again addressed as shown in FIG. 5, line 3, and the B address, together with voice sample VS-1, is transferred to transmit register 123 for transmission on loop 23 in a manner similar to that for frame 1, described above. In the other frames, a similar sequence of operations is performed, using the memory words addressed sequentially as shown in FIG. 5, line 3. Thus the conversational mode of operation provides for the repeated transfer between linked terminals of voice sample signals, under the control of loop controller 20. Each set of linked terminals exchanges voice samples during a 40-frame cycle, and these cycles are repeated at a sufficiently high rate for maintenance of all of the conversations on a time division multiplex basis.

The above description refers to the described two-conversation configuration on loop 10 once the appropriate terminal linkages have been established in memory section 27 of loop controller 20 by stored program computer 15. The establishment of said communication linkages between the respective terminals is now described.

As shown in FIG. 5, the loop controller is effective to sequence through successive frame periods 1 through 39 repetitively. Frames 0 through 38 (except for frame 35), as shown in FIG. 5, are used for inter-terminal communication under the control of the loop controller in this embodiment. Frame 35 is used for supervisory control functions established by the stored program computer 15, which does not require a memory word. Frame 39 is used as a dummy frame for establishing a symmetrical frame pattern, and thus is not used for data or control signal transfer; or frame 39 may be used to provide a special function such as for connecting a data processor to the system for linking to a data device at any of the terminals. The number of control frames varies with the requirements of different installations.

During frame 35, the stored program computer 15 accesses a particular terminal connected to the loop by causing the loop controller to transmit a signal with the particular terminal address. The terminals connected to a loop are successively accessed by the stored program computer on some appropriate basis. The computer's operation would be determined by its own software in response to the needs of the various terminals for service. In one illustrative form of the invention, the computer would access each idle terminal once every 200 milliseconds during normal operation conditions, to determine if service is required (e.g. if a line was requested). Thereupon, the computer would respond to establish a dial tone at the terminal, and thereafter would scan such terminals once every 10 milliseconds to obtain an address digit which the terminal operator had set up on its keyboard.

In operation, the operator of a terminal 41, having an assigned address T-2 on loop 10, for example, might wish to speak with the operator of another terminal on that loop, having an assigned address T-10. To establish this communication linkage, the operator at T-2 first requests service and, when the dial tone is obtained, pushes the appropriate buttons of keyboard 46 sequentially to establish the address for T-10. These address digits are requested one at a time by the computer and each is transmitted to the stored program computer from the terminal's transmit register 52. During a series of frames 35 of loop controller cycling, the stored program computer accesses terminal T-2 to actuate the transfer of this data to register 52 and thence its transmission to the stored program computer via terminal transmit loop 24 and loop controller 20.

The details of this operation are as follows. Before frame 35, computer 15 sends to the loop controller registers 132, 133 and 130, respectively, the following three digital signals: T-2 address, a digital control signal combination destined for terminal T-2 and requesting from T-2 the state of the terminal controls, and a third signal comprising a command signal intended for the loop controller. At the beginning of frame 35, the command signal is decoded in loop controller command decode generator 99 and is effective to cause the loop controller to produce a message in transmit register 126 which is transmitted, together with a sync signal (from sync generator 120), by the loop controller on terminal receive loop 23. The appropriate timing signals to accomplish this transmission are provided by gate 92 in substantially the same manner as described above in the conversational mode of operation. The message comprises a pair of sync bits, address of terminal T-2, the mode bit equal to 1 and the above described computer control signal to T-2 (i.e. the identification request). In a manner similar to that described for the conversational mode and shown in FIG. 5, T-2 recognizes its address and accepts the message and the identification request, via control data register 66 and decode 67, causes the transfer of the reply information established by the keys 46 to the control data transmit register 52. The reply message is sent out on transmit loop 24 in the manner described above, and the address detector 62 and transmit-initiate generator 51 ensure that the reply message is transmitted.

This transmitted message from T-1 is received by the loop controller receive section 26, where the message is temporarily stored, first in register 113 and subsequently in interface section register 132. The information is then transferred to the stored program computer via cable 21*a*.

After receiving the "select digits" by timely interrogations of terminal T-2, the computer 15 is effective from its own processing to first determine whether T-10 is already linked, and hence "busy," and, if not, to select the address of an unused memory word from the 19 memory words in the loop controller memory 101. Before another frame 35, four sets of digital signals are transmitted by the computer 15 to loop controller registers 131, 132, 133 and 130, respectively. A first set, stored in register 131, comprises the address of the unused memory word so selected. In addition, signals comprising the address of T-2 and the address of T-10 are transferred to registers 132 and 133, respectively. As a fourth set, a "write memory" command is transferred to loop controller command register 130. The command signal is thereafter decoded by command decode generator 99 and is effective to cause to be written in the selected memory word of the memory 101 the address of T-2 and the address of T-10.

The selected memory word address, as determined by computer 15 and then transferred to memory address register 131, is gated out of register 131 on command from generator 99 and passed by memory address select gate 102. The addresses of the two terminals to be linked, T-2 and T-10, having been stored by computer 15 in data registers 132 and 133, respectively, are gated out of said registers in response to commands from generator 99 and applied to memory input select gate 103. The command signal stored in command register 130, via generator 99, is effective to enable address select gate 102 and input select gate 103, which results in the writing of the addresses of two terminals that are to be linked, T-2 and T-10 in the selected memory word. With the addresses in a memory word, there is established within the loop controller a communication link between terminals T-2 and T-10. Thereafter, as the loop controller cycles through its frame sequence, that memory word is interrogated in fixed time frames, and the actual transfer of voice samples between T-2 and T-10 in the conversational mode takes place during those frame periods in accordance with the loop controller operation as described previously.

In addition to the above described operation of the loop controller 20 wherein communication links are established and inter-terminal conversations accomplished, loop controller 20 provides the capability of performing additional functions. A first function, operative only during the periods for frame 35, enables the computer 15 to access to memory 101 and interrogate it to determine the contents of any particular memory word, and thereby which pairs of terminals are linked for intercommunication.

To accomplish this function, computer 15 sends two digital control signals to interface registers 130 and 131, respectively: a first signal to command register 130 in the form of a command to read the memory, and the second signal to memory address register 131, comprising the address within memory 101 of the memory word to be read. During frame 35, command decode generator 99 is effective to decode the signal stored in register 130, to gate out the signal in register 131 for memory address select gate 102 and to apply an appropriate input signal to the enable input 94 of memory address select gate 102 and to enable memory read input 105. Read input 105 is effective to read out the two stored addresses in the selected memory word and transfer said addresses to the interface input select gates 135 and 136, respectively. In response to a control signal from command decode generator 99, the signals applied to input select gates 135 and 136 are respectively stored in data registers 132 and 133, and applied via cable lines 21*a* and 21*b* to stored program computer 15.

As another function during frame 35, the loop controller 20 is capable of providing a direct communication link between the stored program computer 15 and a particular terminal for transmission of control signals between the computer and terminal. To implement this function, computer 15 transfers three digital control signals to registers 130, 132 and 133 of interface section 29, which signals respectively comprise, first, a command signal indicating that such a linkage be established; second, the address of the terminal to be so linked; and third, a command signal to be received by the linked terminal.

During a frame 35, the contents of register 130 are applied to command decode generator 99. Generator 99 is effective to decode the command and apply appropriate control signals to registers 132 and 133 in order to transfer the contents of those registers to transmit register 126. In response to the timing pulses developed during frame 35 by gate 92 and applied to sync generator 120 and register 126, loop controller 20 transmits on terminal receive loop 24 a digital signal addressed to the intended terminal. The transmitted signal comprises a sync signal, an address signal, mode bit equal 1 and a control signal. At the intended terminal, the signal is selectively received and the appropriate response signal generated in transmit gate 55. The linked terminal's return transmission is processed by the controller receive section 26 in the normal manner so that the digital control signal from the linked terminal is temporarily stored in register 113. In response to the output signal generated by receive address detector 108 corresponding to a frame 35, the signal stored in register 108 is transferred to registers 132 and 133 via input select gates 135 and 136, enabled by generator 99. The contents of registers 132 and 133 are, in turn, applied by way of lines 21a and 21b to computer 15, thus completing the linkage.

Interloop Operation

This invention is not limited in its use to single loop communication. For example, in a particular application, the required number of conversation paths in a given system may exceed the number of paths provided by a single loop controller and associated loop, or the subscribers may wish to establish communication paths with subscribers in one or more other loops. A loop controller 20 of the type discussed above (FIG. 1) has only a limited number (e.g. 19) of paths (i.e. memory words) available and no provision for interloop communication. By means of the system of FIG. 10, a plurality of loops 10', 11' and 12' are constructed and interconnected by a transfer system so that a communication path can be established from a terminal on any of the loops 20'*a–j* to a terminal on any other loop. The transfer system 17 for the loop controllers provides a number of interloop communication paths if a path is available via the controllers for the respective loops of terminals to be linked.

In FIG. 10, parts similar to those described above are referenced by the same numerals, and modified parts are referenced by the same numerals with the addition of a prime ('). The loop controllers 20'*a–j* have remote output terminals o/p (R) respectively connected to the IN buffers 220*a–j* of the interloop transfer system 17 via lines 234*a–j*, and remote input terminals i/p(R) connected to the OUT buffers 222*a–j* via lines 232*a–j*, respectively. Interloop transfers are made from a first controller via the corresponding IN buffer 220*a–j* and the transfer bus 227 to the selected second controller via a corresponding OUT buffer 220*a–j* under control of queue logic 250.

Figure 11:
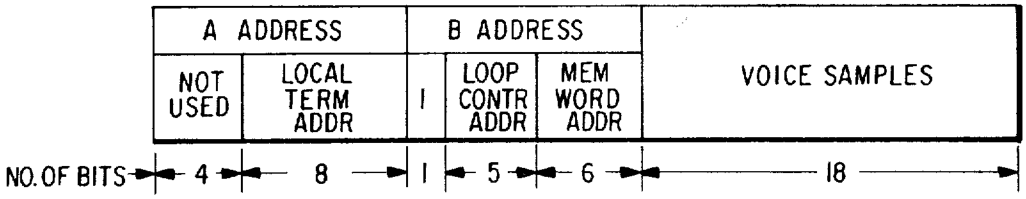
FIG. 11 is a schematic diagram showing the memory word format for the system of FIG. 10.

The special format of a word in the loop controller memory 101 for interloop communication links is shown in FIG. 11; the format for all intraloop operations is generally the same as previously described and is shown in FIG. 6. That is, the memory word configuration of FIG. 11 uses the first bit in the B address portion to denote by a 1 bit that the remaining address bits refer to a terminal on another loop, which is identified by the next 5 bits for the loop address, and the following 6 bits for the memory word address thereof. Where the first bit is 0, the remaining bits refer to a communication path to a terminal on the same loop, and the terminal address is denoted as shown in FIG. 6. The A-address and B-address portions of the memory words give rise to different times and modes of operation, hereinafter referred to as "A-service" and "B-service." Thus, when the communication path is to a terminal on a remote loop, the B-service address bits at the local controller identify the remote loop controller address and the path number (i.e. memory word) used to complete the communication path. The local loop controller, in the embodiment described hereinafter, establishes the path from the local terminal to the local controller during the A-service, and to the remote controller during the B-service.

Figure 13:
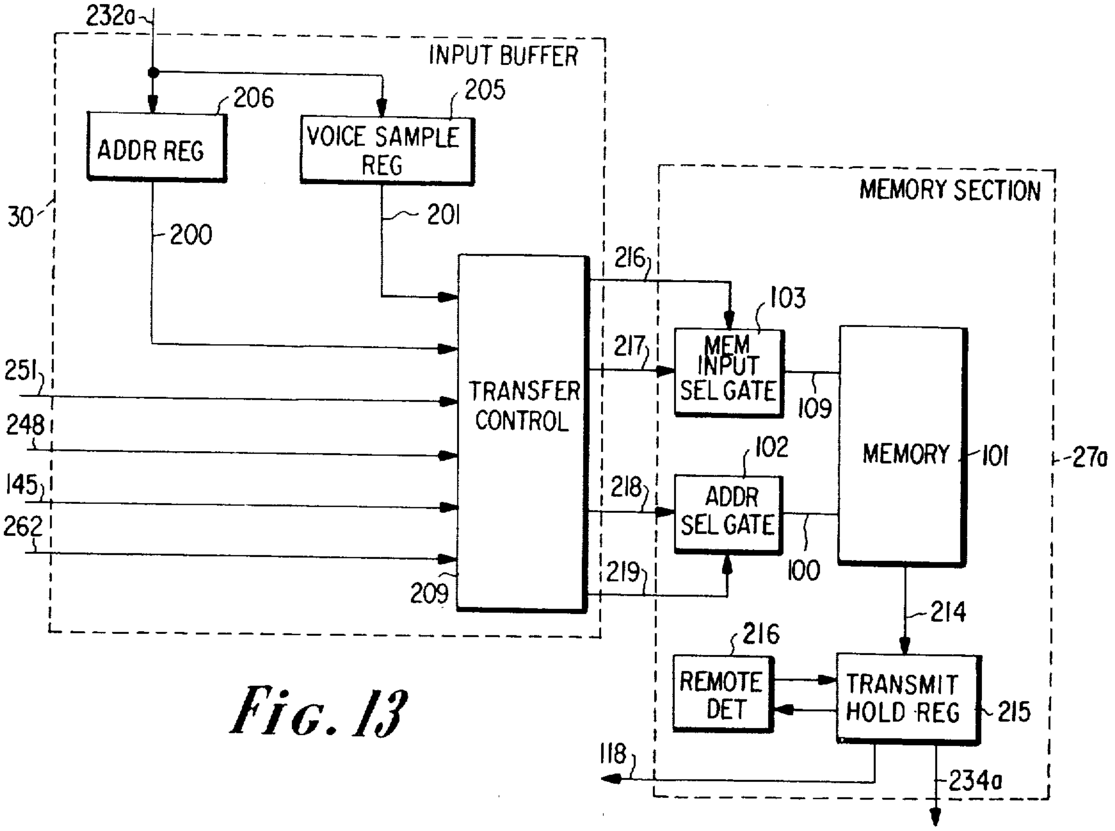
FIG. 13 is a schematic block diagram of a portion of the system of FIG. 10.

The loop controllers 20'*a–j* are the same as the above described controller of FIG. 4, with the addition of the control circuits shown in block diagram form in FIG. 13, in which an input buffer 30 has lines 216, 217, 218, 219 connected as inputs to memory section 27'(which is generally the same as memory section 27 with some modification for multiloop operation). Each loop controller, say 20'*a*, has an associated set of parallel input lines 232*a* connected from the corresponding OUT buffer 222*a* of transfer system 17 to input buffer 30; the latter comprises address register 206 and voice sample or data register 205 (which receive the corresponding signals from the respective lines 232*a*) and transfer control 209. The output of address register 206 is applied via line 200, transfer control 209, lines 218 to address select gate 102, and via line 100 to memory 101. The output of voice sample register 205 is applied via line 201, transfer control 209 and lines 216 to memory select gate 103, and via line 109 to memory 101. A first timing input to transfer control 209 is applied via line 145 from frame counter 93 and, in addition, timing inputs 248, 251 and 262 are applied from timing gate 92. A detailed description of control 209 is provided below. The output of memory 101 is connected via line 214 to transmit hold register 215, which supplies the mode bit to remote detector 216, the output of which is connected back to the transfer select control of register 215. A first output path from register 215 is via line 234 to transfer system 17 for interloop operation, and a second via line 118 to transmit section 25 in the manner described above for intraloop operation.

Figure 14:
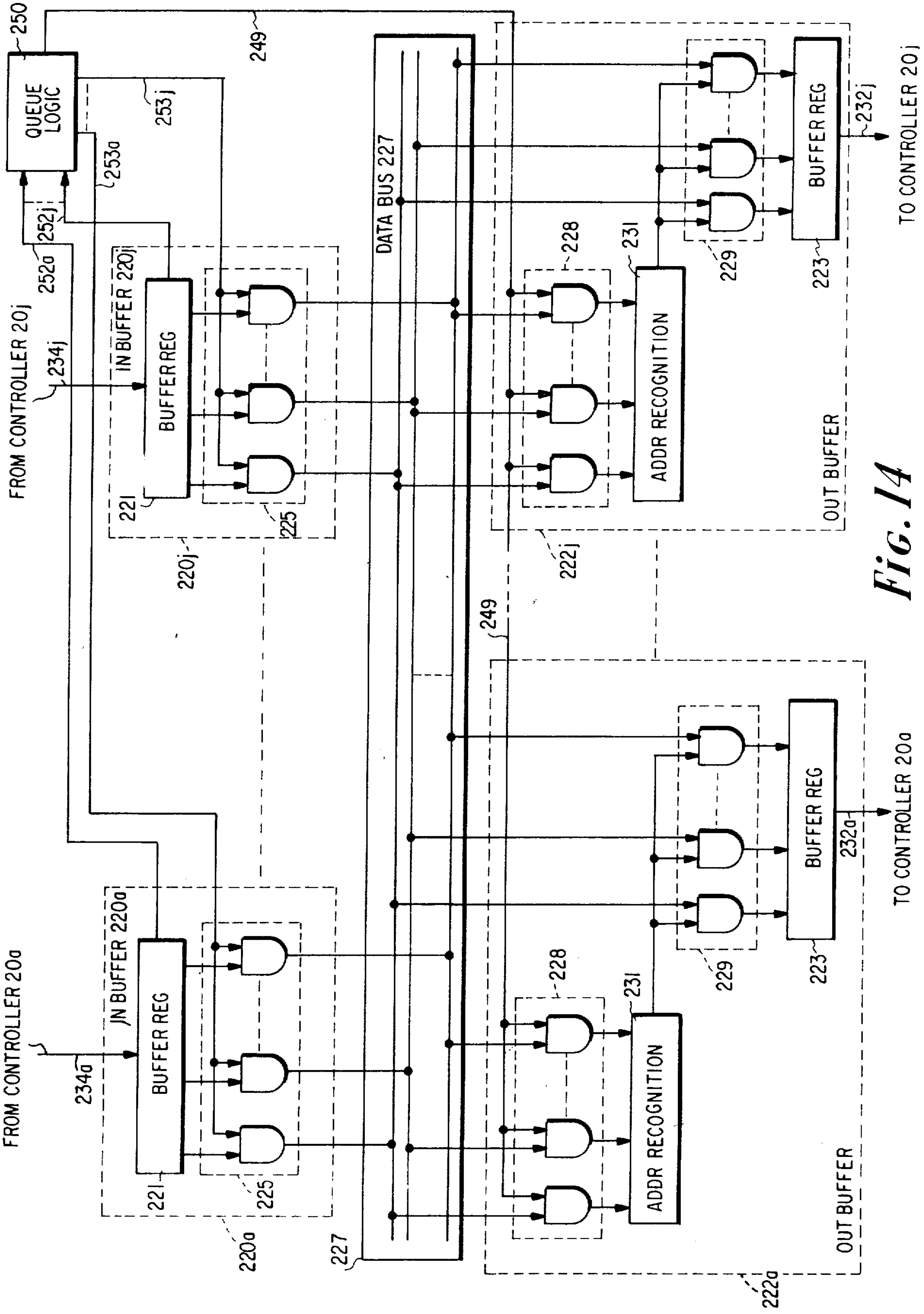
FIG. 14 is a schematic block diagram of another portion of the system of FIG. 10.

Transfer system 17 (FIG. 14) has a separate input line 234*a–j* for each loop controller 20*a–j*, which serves for the parallel transfer of a message word made up, for example, of a remote loop controller address, a remote memory word address, and voice samples (i.e. the B address data shown in FIG. 10). Lines 234*a–j* are interconnected for multiloop operation to a respective IN buffer 220*a–j*, each of which buffers comprises a buffer register 221 and a set of gates 225 connected to accommodate the parallel transfer of the multi-bit message word stored in buffer register 221 corresponding to a set of parallel buses comprising data bus 227. The enabling inputs of all gates within the sets 225*a–j* are connected in common to an associated control line 253*a–j*. Each buffer register 221 has in addition a separate output connection 252*a–j* to the common queue logic 250. A plurality of the parallel bus lines comprising data bus 227, connected so as to correspond to the loop controller address portion of the message word (e.g. five of said bus lines), is connected to the corresponding data input terminals of the gates (e.g. five) within each of the sets 228 in OUT buffers 222*a–j*. Similarly, the plurality of bus lines corresponding to the memory word address and data sample portion of the message word (e.g. 24 of such lines) are connected to the respective data input terminals of each of the respective gates (e.g. 24 gates) within sets 229 in OUT buffers 222*a–j*, the outputs of each of which are connected to the respective input terminals of buffer registers 223. Thereby, they are connected to accommodate the parallel transfer of the memory word address and voice sample portions of the word from data bus 227 to a respective one of buffer registers 223. A common strobe output signal from queue logic 250 is supplied via line 249 to the enabling input terminals of each of the gates 228. The output lines of the gates 228 are connected to the data input of the respective address recognition circuit 231, whose output, in turn, is connected to the enable input of all of the gates 229. The common strobe output signal on line 249 to gates 228 is effective to pass to all the recognition circuits 231 the applied address word to be compared with a present address word uniquely corresponding to a particular loop controller. The one address circuit 231 that recognizes the address word from bus 227 is effective to enable the corresponding one of gates 229 to transfer in parallel to the corresponding buffer register 223 the memory word address and voice sample portions of the interloop message word, and thereby via the associated line 232*a–j* to the addressed loop controller 20*a–j*, which is thereby effectively interconnected for multiloop operation.

In the operation of the herein described embodiment, transfer of data via the loop interconnect system is accomplished during B-service intervals only. At the beginning of a B-service frame, the B address and voice sample portions of the contents of the addressed memory word are transferred within the loop controller via line 214 to transmit hold register 215. The remote detector 216 senses the first bit in the B address portion to determine whether or not the address is local or remote, i.e., whether the identifying bit is 0 or 1. If a 0, the address is local, and the message word is transferred via line 118 in the manner for intraloop operation described above for FIG. 4. If a 1, the address is remote and the interloop data signal message is transferred via the associated one of the sets of lines 234*a–j* to the connected one of IN buffers 220*a–j* of transfer system 17. Queue logic 250 detects, via a signal on one of the lines 252*a–j*, the reception of an interloop message by the associated buffer registers 221*a–j* and maintains a sequential list of any such receiving registers according to the order of receipt. In that same order of receipt, logic 250 via a signal on the appropriate one of lines 253*a–j* enables the corresponding gates 225, thereby gating to data bus 227 the 29-bit interloop messages, one at a time, in the order of receipt; that is, on a first in, first out basis. Thus the interloop messages received by IN buffers 220*a–j* are sequentially applied to data bus 227 in the order of receipt. The gates 228 of all of the OUT buffers 222*a–j* are enabled at the appropriate time following the transfer of a received message to bus 227 by the strobe output of logic 250 applied via line 249, and, in response thereto, those gates 228 apply the loop controller address portion to address recognition circuits 231. The one of circuits 231*a–j* that recognizes its own address enables its associated set of gates 229 to pass from bus 227 the interloop message to the corresponding registers 223 for transfer to the addressed controller by the associated ones of lines 232*a–j*.

In the addressed loop controller, the 24-bit interloop message is received by input buffer 30, with the memory address portion of this message applied to address register 206 and the voice sample portion to voice sample register 205. Transfer control 209 is effective in response to timing signals from timing gate 92 and frame 93 to apply at the appropriate time the address portion in register 206 to the data input of address select gate 102, the voice sample portion in register 205 to the data input of memory input select gate 103, and signals via lines 219 and 216, respectively, to the enable inputs of gates 102 and 103, which in turn enable the storage of the voice sample in the addressed memory word location of memory 101. Thus the local loop controller memory 101 receives for storage voice samples from a terminal on a remote loop which may be subsequently transferred within the local loop during an A-service period to the appropriate terminal in the manner described above for FIG. 4.

Figure 12:
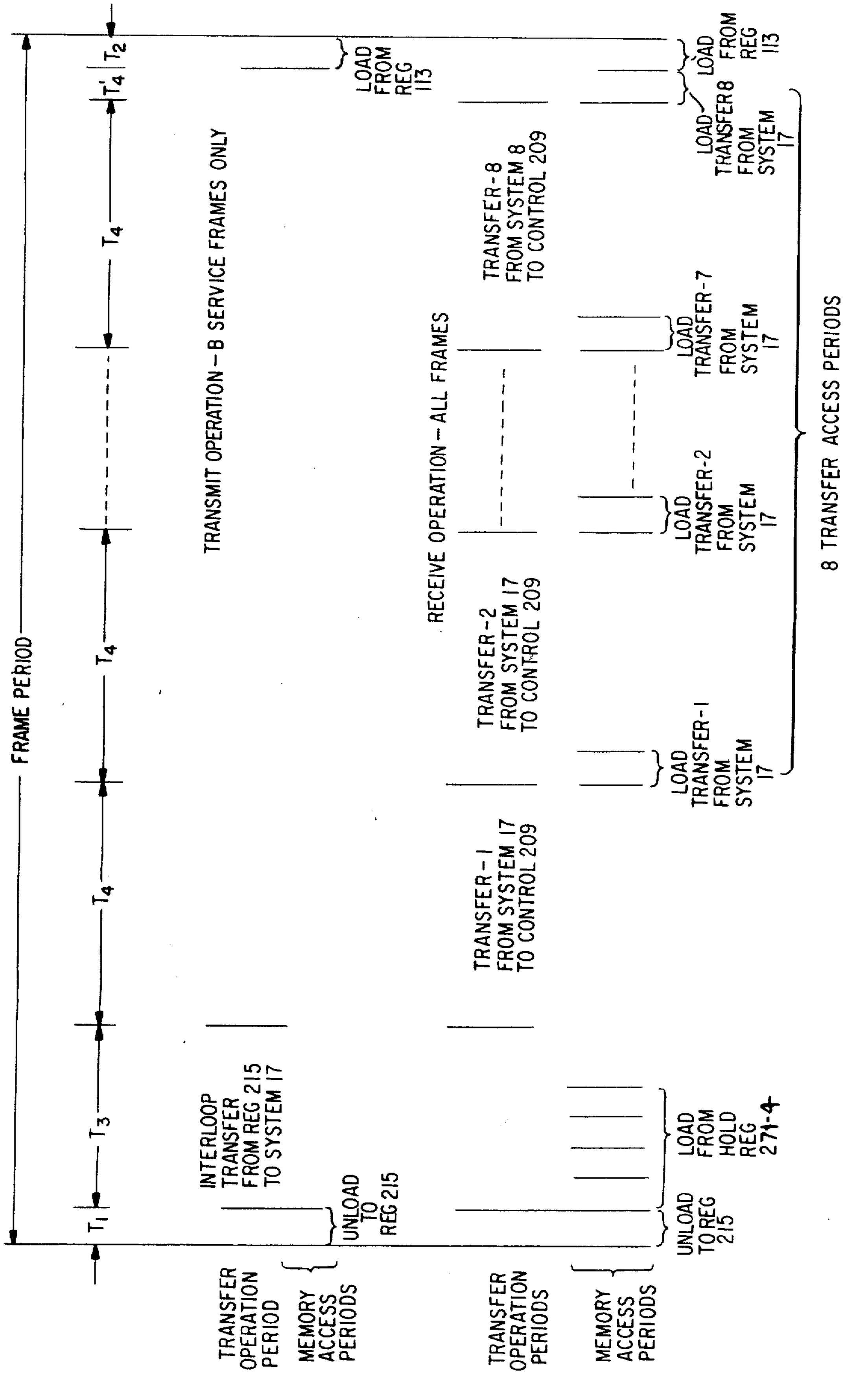
FIG. 12 is a schematic graphical diagram illustrating a portion of the operation of the system of FIG. 10.

The sequence of transfer control 209 operation may be more fully understood by reference to FIG. 12, which shows an expanded timing sequence within one frame. As described above for a communication link on a single loop, the appropriate memory word establishing the communication path is accessed two times during a frame, i.e. a first time to extract and store in the controller's transmit register 126 and address and message for transmission to the local terminal, and a second time to store in the memory word via select gate 103 from register 113 a received message from the local terminal. In the embodiment described herein, these memory access times for each frame are short compared with the frame period, and are denoted in FIG. 12 as $T_1$ and $T_2$, respectively. In an interloop configuration as described above, all transmissions from the local loop to a remote loop occur during B-service frames and, as shown in FIG. 12, a time period $T_3$ is allocated for the time to transfer the interloop message from holding register 215 to the associated one of IN buffers 220*a–j* of transfer system 17. In addition, during interloop operations, additional memory access periods $T_4$ are required during a frame for writing some interloop message into memory.

Since the frame count of the several loop controllers that may be connected is not necessarily identical, and since transfer system 17 operates on an asynchronous basis, an interloop message may be applied to the input buffer 30 of a loop controller at any time during that controller's current frame cycle. Consequently, an interloop message may be received by a loop controller in which the memory word addressed by that message may currently either be in the access period, or that memory word may then be storing a voice sample previously received from the local terminal but not yet transmitted. In either of such cases, the immediate storage of the received message word would destroy the voice sample from the local terminal. In order to accommodate such interloop transfers, the critical memory access is deferred until after the transmission of the previous message stored in the memory word to be accessed. For this purpose, transfer control 209 is effective to detect the group number (as derived from the first three bits of the memory word address in the interloop message) during which the memory word is regularly addressed, and further, to determine whether the local frame counter of that loop controller is currently in the same group. Such a match of group numbers indicates a possibility that the immediate storage of the received message in the designated memory would interfere with a not yet transmitted message from the local terminal which was previously stored in that word. Upon finding such a match of the current local group number with the group number of the memory word addressed by the received message, control 209 is effective to temporarily store the received message until the first frame of the next succeeding group of the local loop controller, whereupon the appropriate memory word is then addressed and the received message is stored. An example of the operation of control 209, in order to avoid the potential interference condition of the addressed memory word, is described below in conjunction with FIG. 15.

A loop controller may receive interloop transfer messages at any time during a frame. FIG. 12 shows the allocation of time periods within a frame for an embodiment in which as many as eight interloop transfer messages may be accommodated within a single frame. A greater or lesser number of transfer messages may be accommodated in other embodiments, as described below, depending on factors such as data rate, circuit speeds and the like. At the beginning of each frame, the first access to the loop controller memory during $T_1$ is used to unload the appropriate data from a memory word and to transfer such data to register 215. During the next time period $T_3$, which occurs during the B-service frames, the data word stored in register 215 may be transferred to system 17 (if designated for an interloop communication) or to register 126 (if designated for intraloop). Also during this time period $T_3$, in the first frame of loop controller operation following a change in local group number, as many as four memory words addressed during the previous group may be accessed in order to store temporarily held interloop messages (which, as described above, may have been temporarily stored during the previous group period as a consequence of the detection of an identical group member of the received message and of the loop controller).

Each of a sequence of nine further time periods, the first eight of which are designated $T_4$ and the short ninth $T_4'$, is allocated to accommodate the transfer of as many as eight successive interloop message signals from system 17 to control 209. Immediately thereafter, initial portions of the second through the eighth of the periods $T_4$ (and the short ninth period $T_4'$), are used for the respective accessing of the appropriate memory word to load the transferred message into said word in all cases where control 209 is effective to determine that the appropriate group numbers of the received message words are different from the local group number. The strobe signals on line 249 (FIG. 14) repeat at the $T_4$ rate. A greater or lesser number of interloop transfer operations may be accommodated during a single frame in other embodiments. A final memory access is indicated for time period designated $T_2$, in which the received signal from the local terminal transmission (as stored in local register 113) is transferred to the appropriate memory word. During each of the eight interloop transfer periods, some or all, or none of such transfers may occur, depending on the particular communication link in operation at any particular time. Similarly, the four memory access periods during time period $T_3$ may or may not be utilized during any given frame depending on the particular communication links established, and also on the relative frame count of the interconnected loops. Thus, if the group number of the memory word addressed by the remote transmission is different from that of the local loop as described above, the appropriate memory words may be accessed immediately following the respective intervals denoted $T_4$ and $T_4'$ in FIG. 12 (the intervals $T_4$ represent the period required to provide an interloop transfer from IN buffer to an OUT buffer in system 17 and to register 30 in the appropriate loop controller. If the group number of the addressed memory word in the remote transmission is the same as that of the local loop controller, the received data is temporarily stored in transfer control loop 209 for the duration of the current group, whereupon the appropriate memory word is accessed during the next succeeding frame to store the data in the $T_3$ period of that frame in the next group. Thus during a frame, the first access to memory 101 reads and transfers data to transmit holding register 215. The second access to the memory during a $T_3$ period is used when required to store in the memory information held by transfer control 209 received during a previous group period. During the first transfer period $T_4$ , the interloop message is transferred from system 17 to control 209 and during the first portion of the next subsequent transfer period $T_4$, information received by the interloop transfer system 17 during the first transfer period $T_4$ is stored. This latter operation repeats through the eighth $T_4$ transfer period, after which the additional $T_4'$ period is used to store the final interloop transfer information. Thereby, the number of loop controllers that can be accommodated in an embodiment is dependent on the number of transfers that can be accommodated within one frame. Calculations to determine the maximum number of transfers during a frame are presented below for one embodiment of the invention.

Figure 17:
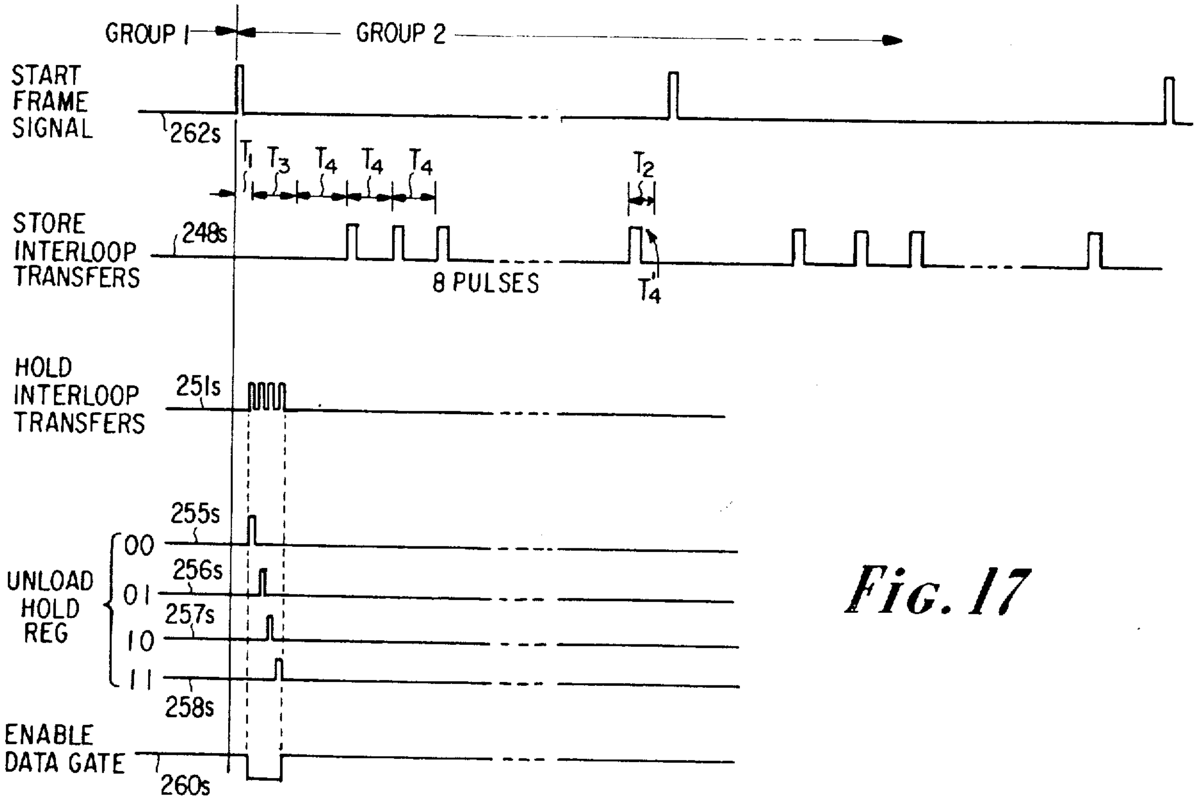
FIG. 17 is an idealized graphical diagram of waveforms occurring in various portions of the transfer control of FIG. 16.
Figure 16:
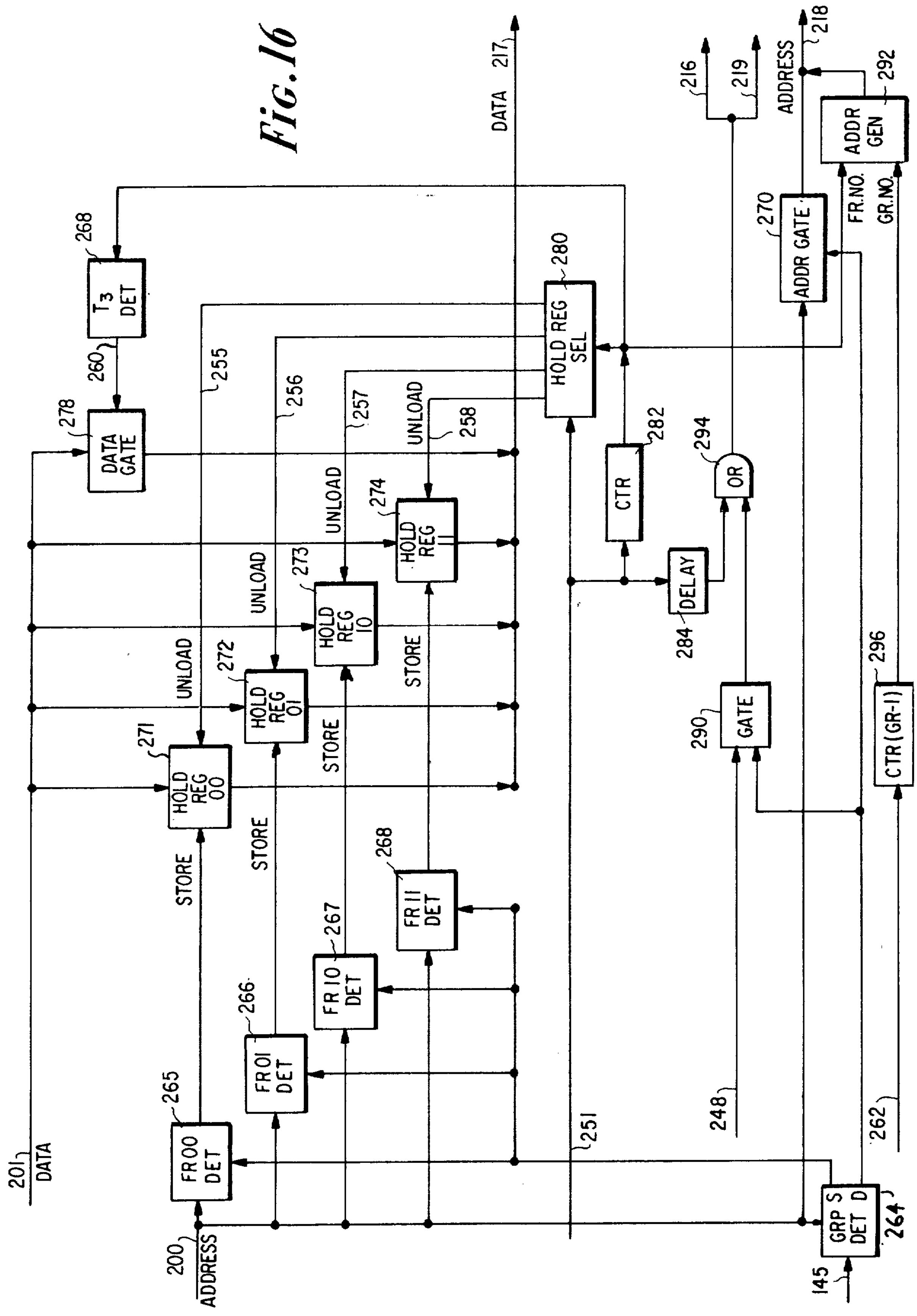
FIG. 16 is a schematic block diagram of the transfer control of FIG. 13.

The detailed function performed by transfer control 209 may be more fully understood by reference to FIGS. 16 and 17. In FIG. 16, transfer control 209 is shown in block diagram form, in which the 5-bit memory word address portion of the received interloop message signal is applied via line 200 (from register 206) to group detector 264, to the data inputs of frame detectors 265–268, and also to the data input of address gate 270. The input of detector 264 receives, via line 145, the output of frame counter 93 in timing and control section 25. A first binary output S of detector 264, corresponding to the group numbers being the same, is connected in common to the enabling inputs of frame detectors 265–268. A second binary output D, for different group numbers, is the complement of the S output and is connected to the enabling input of address gate 270 and also to the enabling input of gate 290. The voice sample input to transfer control 209 is applied, from data register 205 via line 201, to the data inputs of hold registers 271–274 and to gate 278. The respective outputs of detectors 265–268 are connected to the respective store inputs of registers 271–274, and the output of detector 268 for $T_3$ is connected to gate 278. The outputs of these registers and gate are connected in common to line 217 which is, in turn, applied to a data input of memory input select gate 103 in memory section 27 (FIG. 13). Timing line 251 is connected from timing gate 92 in timing and control section 25 and applied to hold register select gate 280, counter 282, and delay 284. Input line 248 is also connected from timing gate 92 to gate 290. The output of counter 282 is connected to the gating inputs of select gates 280, to the frame number input of address generator 292 and also to $T_3$ detector 268. The respective outputs of select gates 280 are applied via lines 255–258 to the respective unload inputs of hold registers 271–274. The outputs of delay 284 and of gate 290 are connected to the respective inputs of OR gate 294, whose output is applied via lines 216 and 219 to the enabling inputs of memory input select gate 103 and address select gate 102 of memory section 27 (FIG. 13). Line 262 is connected from the input of frame counter 93 to counter 296, whose output is connected to the group number input of address generator 292. The output of generator 292 is connected to the output line 218 from address gate 270 which applies the address to the address select gate 102 of memory section 27 (FIG. 13).

Transfer control 209 operates in response to a 29-bit received interloop message word stored in registers 206 and 205. The address portion of the received word corresponds to a memory word address in memory section 27, and comprises 5 bits, the first 3 bits corresponding to a binary coded group number and the last 2 bits corresponding to the frame in which that word is addressed. In transfer control 209, this address portion of the received message is received via line 200 and the group bits thereof are compared in group detector 264 with the current group number of the local controller as indicated by the frame count signal on line 145 from frame counter 93.

As described above, in the case where the group number contained in the message address (which represents the regular access time) is different from the current local group number on line 145, the voice sample portion of the interloop message may be immediately stored in the memory in section 27 in the manner now described. Detector 264 is effective via the D output to enable gate 290 to pass the timing signal applied to line 248. The signals 248S on line 248, as shown in the waveform diagram of FIG. 17, are pulses at the beginning of the $T_4$ and $T_4'$ periods corresponding to the memory access periods for loading interloop messages as described in connection with FIG. 12 for a system allowing eight transfers per frame. Thus, a transfer memory access pulse is passed by gate 290 and via OR gate 294 to the enabling inputs of memory input select gate 103 and address select gate 102. The D output of the detector 264 also enables gate 270 to pass the received address from lines 200 and via lines 218 to address select gate 102. At all times within a frame except during $T_3$, counter 282 is in its maximum count state and detector 268 generates an output signal 260S (FIG. 17) via line 260, which is effective to enable data gate 278 and thereby pass the data portion of the received interloop message via line 217 to the input of memory input select gate 103. Thus, at the time that an enabling signal is applied via lines 216 and 219 to gates 103 and 102, the appropriate memory word address for the storage of the voice sample on line 217 is available on line 218 and consequently the voice sample is stored in the appropriate memory word for subsequent transfer within the local loop to the linked local terminal in the manner described above for FIG. 4.

In a case where the group number of the received address is determined by detector 264 to be the same as the current group number of the local loop controller, the S output of detector 264 is effective to enable detectors 265–268. Each of detectors 265–268 corresponds to a diffferent one of the possible 2-bit binary frame designations 00 to 11 which occur within a group period. Upon activation by group detector 264, the frame detectors compare the frame portion of the received address (the last two bits) with their respective frame designations, and the one detector that determines a match in said frame designations is effective to apply an appropriate signal to the store input of a corresponding one of hold registers 271–274, which is effective to store the voice sample portion of the received interloop message received via line 201. (It is of no consequence that gate 278 may also be effective at this time to apply the voice sample portion via line 217 to the input of memory input select gate 103, since the D output of detector 264, which is the binary complement of output S, is effective to disable gate 290 and thus no enabling timing pulses may activate gate 103.) Since there are four memory words addressed within a group, as many as four coincidences of a group number may be detected by detector 264 corresponding to each of the different frames (and memory words) within any group. Thus, during a particular group, all of registers 271–274 may under appropriate conditions store voice samples from different remote terminals for the duration of that group in the local loop controller. Line 251 from timing gate 92 provides the appropriate timing pulses to form the hold memory access signal 251S (FIG. 17) during the $T_3$ portion of the first frame of each new group. These signals serve to transfer voice samples held in registers 271–274 to line 217 for storage in the appropriate memory word of section 27. The hold memory access signals 251S on line 251 comprise four memory access pulses which are applied via delay 284 and OR gate 294 and lines 216 and 219 to enable gates 103 and 102 of memory 27 at the appropriate times during the $T_3$ period of the first frame of each new group. Counter 282 provides a binary count output of the pulses 251S applied via line 251, which output is applied to register select 280, which in turn is effective to gate via lines 255–258 the pulses 255S–258S (FIG. 17) to the respective unload inputs of hold registers 271–274. In response to these signals, the stored voice sample portions of the received interloop signal are successively developed on line 217 in the corresponding order of frames as stored in registers 271–274 and applied to the memory input select gate 103. The frame portion of the address for the corresponding voice samples is determined from the output of counter 282 as applied to the frame number input of address generator 292. Line 262 applies a start of frame signal 262S (FIG. 17) to the counter 296; the 6-bit output of counter 296 is delayed by a binary count 001000 from the 6-bit count output of frame counter 93, so that the 3 most significant bits of the counter 296 output equal the 3 bits of the previous group number. These 3 bits of the output of counter 296 are applied to the group number input of address generator 296 to identify the memory word for that previous group number. Generator 292 is effective to apply to line 218 the appropriate 5-bit address comprised of the 3 bits from counter 296 and 2 bits from counter 282 corresponding to the memory word addresses for the successively applied voice samples as they are transferred to line 217 from the respective hold registers 271–274. The enabling signals on lines 216 and 219 are effective to direct the storage of the voice samples applied on line 217 in the memory word whose address is supplied on line 218. In this manner, the temporarily stored voice samples, having previously been received during a time in which their immediate storage may have produced a conflict in memory access, are subsequently stored during the first frame in the next succeeding group in the appropriate memory word to complete the interloop communication link, and are subsequently transferred within the local loop to the appropriate terminal in the manner described above for FIG. 4.

Figure 15:
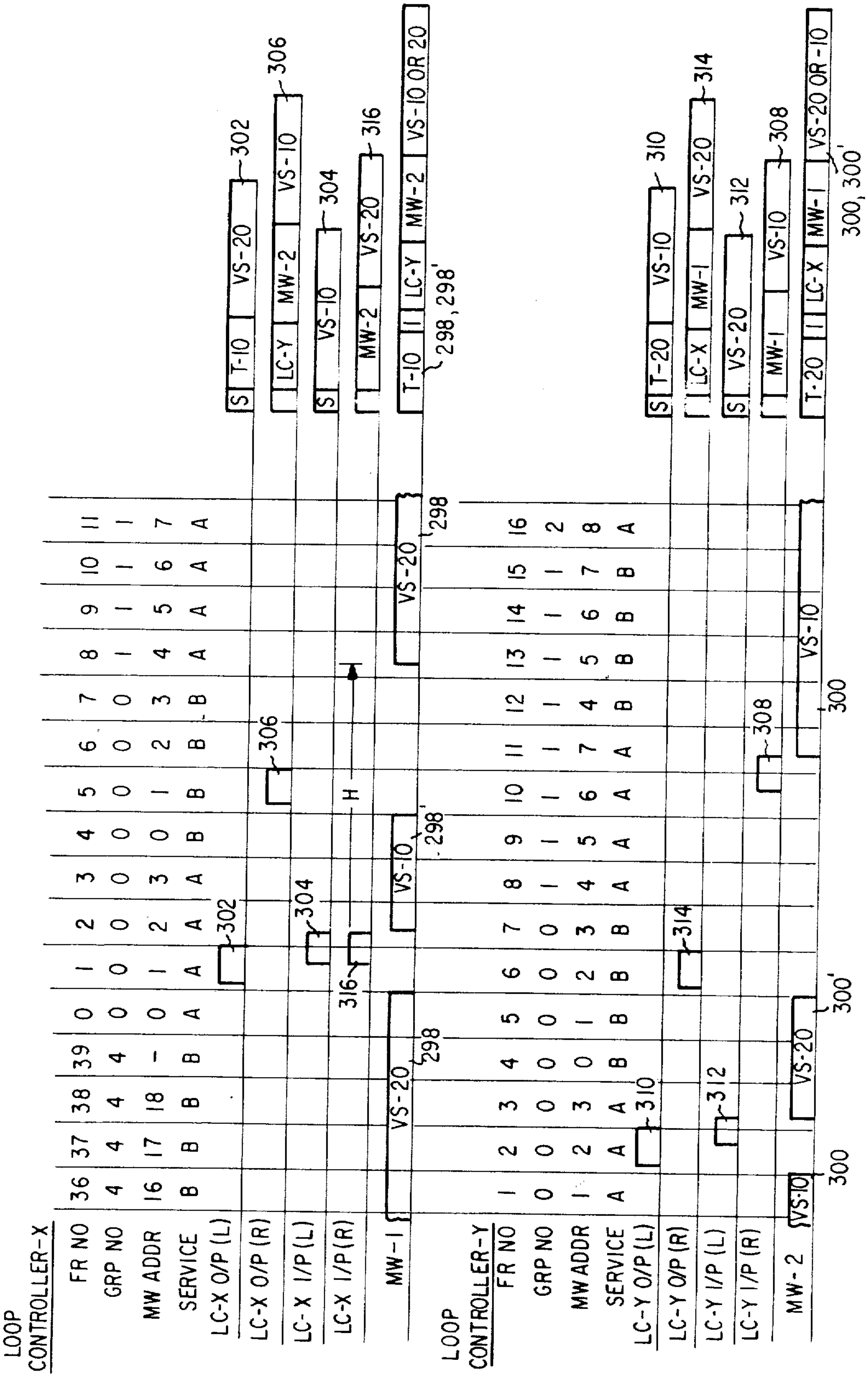
FIG. 15 is an idealized graphical diagram of time relationships of various operations performed in the system of FIG. 10.

The overall operation of the transfer control 209 is described with reference to FIGS. 10 and 15, in the context of a specific example. FIG. 15 is a graphical diagram for explaining the operation of FIG. 10 in which terminal T-10 on loop X is linked with terminal T-20 on loop Y, via loop controller X (LC-X), interloop transfer system 17 and loop controller Y (LC-Y). FIG. 15 shows on a common time scale for LC-X and LC-Y the periods of transmission and reception on the respective loop controller local output and input lines o/p(L) and i/p(L) and remote output and input lines o/p(R) and i/p(R), and also the contents of memory word MW-1 of LC-X (assigned by SPC 15 as the path between terminal T-10 and LC-X) and memory word MW-2 of LC-Y(assigned by SPC 15 as the communication path between terminal T-20 and LC-Y). Also shown for reference, for the respective loop controllers, are frame number, group number, memory word addresses, and the A and B types of service. FIG. 15 shows in a column on its right the format of the messages in transmission or in storage indicated by the corresponding blocks on the same line on the left and referenced by the same numerals. FIG. 15 shows that, although the frames for both LC-X and LC-Y are synchronous (i.e., begin and end at the same time due to a common or synchronized clock system), the particular frame numbers do not necessarily coincide. The contents 298 or 298′ of memory word MW-1 in LC-X and the contents 300 or 300′ of MW-2 in LC-Y are of the form shown in FIG. 11, designating interloop operation.

The operation is explained starting with frame 1 for LC-X, during which LC-X is effective to transmit on the local loop 23*a* a message word 302 addressed to terminal T-10 and containing a voice sample VS-20 from terminal T-20 as previously stored as part of the contents 298 of memory word MW-1. Also during frame 1, the local input i/p(L) of LC-X receives via loop 24*a* a reply message word 304 from terminal T-10 containing a voice sample VS-10 which is immediately stored as part of the contents 298′ of MW-1 for later transmission to terminal I-20 of loop Y. During frame 5, LC-X again addresses memory word MW-1, this time in the B service, and is effective to transmit to the interloop transfer system 17 an interloop message 306 containing the address LC-Y of the loop controller Y, the memory word address of the communication path in that remote loop, MW-2, and the voice sample VS-10 from terminal T-10. After passing through transfer system 17 to i/p(R) of LC-Y, the LC-Y address of the transmission 306 is dropped, which produces message 308 (containing the LC-Y address and voice sample VS-10). Upon receipt of message 308 by LC-Y, its transfer control 209 detects that the current group number of LC-Y (i.e. group number 1) is different from the group number (i.e. group number 0) during which memory word MW-2 is normally addressed by LC-Y. As a result of this determination, transfer control 209 is effective to immediately store in MW-2 of LC-Y the VS-10 of the message word, as indicated by 300. Memory word MW-2 is next addressed by LC-Y as shown, during frame 2 of group 0 to obtain its contents 300. A message 310 is formed which is addressed to T-20 and transmitted on the local output o/p(L) of LC-Y via terminal transmit loop 23*b* to T-20. In response to the data word 310, T-20 transmits, via loop 24*b*, a reply data word 312 which contains VS-20, and when it is received at the LC-Y local input i/p(L), it is immediately stored as part of the contents 300′ of memory word MW-2. The B service of memory word MW-2 in LC-Y is performed during the next frame 6, in which a message word 314 is generated for transmission on the LC-Y remote output o/p(R). This transmission, via transfer system 17 to the LC-X remote input, is received in LC-X as message word 316 (without the LC-X address). At this time, transfer control 209, under control of timing signals from timing gate 92 and frame counter 93, compares the group number bits of the memory address portion MW-1 of the received message 316 with the current group number of LC-X and determines that the group number (corresponding to the time at which memory word MW-1 is regularly addressed by LC-X) is the same as the current group number of LC-X. As can be seen from FIG. 15, during frame 1, LC-X receives from terminal T-10 a reply message 304 containing VS-10 for immediate storage in MW-1 (see 298′), and for subsequent transmission during frame 5 as message 306 to terminal T-20. Thus, the immediate storage in MW-1 of the received voice sample VS-20 of message 316 would result in the destruction of VS-10, which has not yet been transmitted (and will not be until frame 5). Transfer control 209 is effective to temporarily store the received voice sample 316 in the appropriate register for the time period indicated as H in FIG. 15, i.e., until control 209 determines that the current group number of loop X is changed to the next succeeding group number, whereupon the remote voice sample is stored in the appropriate memory word. That is, during frame 8 (FIG. 15) control 209 is effective to transfer the received voice sample VS-20 from temporary storage in control 209 to memory word MW-1 in LC-X as message 298. In this fashion, if the memory word addressed by the interloop message is regularly accessed during the same group number as the current frame for the local loop, a delay is provided for the storage of the message from the remote loop, in order to ensure that the received message from the local terminal is not destroyed by its companion interloop message coming from the remote loop prior to transmission of the local terminal message to that remote loop. This delay is directed by transfer control 209 which is effective to store in the appropriate ones of hold registers 271–274 the received voice signal until the current local group number changes.

Figure 2:
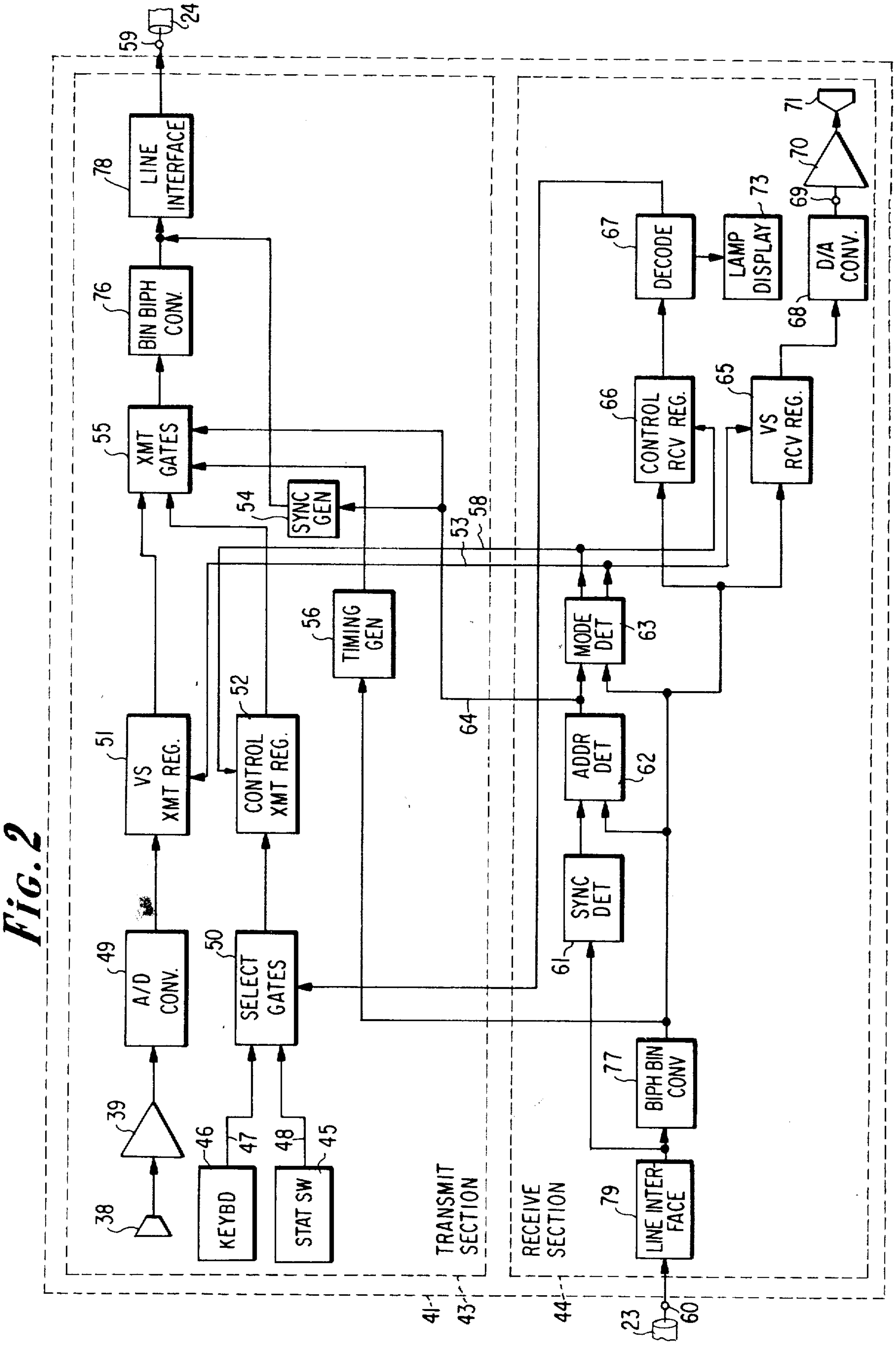
FIG. 2 is a schematic block diagram of a terminal used in the system of FIG. 1.

The control of the system by means of the stored program computer 15 may be illustrated in an assumed telephone system which has four loops, with each loop controlled by a loop controller and with a loop interconnection system 17 as described above for FIG. 10. On each loop of the assumed system there are 75 telephone terminals 41, each of which is configured as indicated in FIG. 2 where transmitter 38 and receiver 71 are, for example, housed together on a telephone type hand set. A status switch commonly located in the hand set cradle is referred to as the "hook switch," and this switch may be either in the "off-hook" or "on-hook" state indicating respectively the two hand set conditions, i.e., whether the subscriber at the terminal has lifted the hand set in order to effect a communication or not. There are "dialing keys" zero through nine and a "dial" light, and a "ring" tone generator. In order for a call to be made, the subscriber picks up his hand set, receives a dial light, and enters three digits by means of the dialing keys to identify the called party.

As used herein, the term "scan" refers to the act of interrogating a terminal on a cyclic basis. The interrogation required is based on the status of a terminal at any particular moment. Such an interrogation by the computer has been discussed above, and briefly it consists of the computer sending to the controller an "interrogate terminal" command along with the terminal's address on the loop and a control signal configuration indicates to the terminal the type of information requested. During the "control frame" (e.g. frame 35), the controller transmits the terminal's address and control information on the loop; the terminal replies with the requested information, and the loop controller places this information in the interface registers for transfer back to the computer 15.

For this example, it is assumed that terminal T-23 on loop 2 is calling terminal T-45 on loop 4 whose "phone number" is "672." The sequence of operations is as follows:

1. The computer 15 continuously scans all of the terminals in the system on a cyclic basis (e.g. every 200 milliseconds) for a change in the status of the hook switch.
2. Upon a certain scan of terminal T-23 on loop 2, a change in status from on-hook to off-hook is detected by computer 15, which is then effective to determine if a "dialing register" is available. This register corresponds to a location in memory to store the dialed digits. Since the dialing process represents an increased scanning load on the computer as described below, the computer's stored program limits the number of terminals that may be "dialing" at one time by enabling only a certain number for dialing, based, for example, on the number of "dialing registers" that are available.
3. Computer 15 transmits an enable command to the terminal T-23 via the controller for loop 2, causing the dial light at that terminal to be turned on.
4. Computer 15 is then effective to scan terminal T-23 on loop 2 for dialing information at a faster cyclic rate (e.g. every 10 milliseconds).
5. Each of these scans monitors control key status to detect the first digit of the dialed number. After the first digit 6 has been detected on successive scans, computer 15 continues scanning to detect the inter-digit period between the time the subscriber removes his finger from one control key and places it on the next.

6. The termination of the inter-digit period time is detected, whereupon the scan operation continues to detect the second digit 7. Steps 5 and 6 are repeated until the end of the third digit 2 is detected. All three of the digits are stored in the dialing register in memory of computer 15.

7. Computer 15 transmits a command to terminal T-23 which is effective to turn off the dialing light.

8. Computer 15 then begins the "call processing" routines as follows:

a. The called number 672 is translated by table look-up means to terminal T-45 on loop 4;

b. The current state of terminal T-45 is examined in the computer memory to determine whether or not the terminal is idle.

c. If the terminal is idle, the usage record for loop controller 2 and loop controller 4 is examined to determine if there are idle paths on which to establish the communication link between T-23 and T-45.

d. Assuming the determination that memory word 8 in loop controller 2 and memory word 15 in loop controller 4 are idle, computer 15 reserves these memory words for the conversation path linking T-23 and T-45.

e. A command is sent to terminal T-45 on loop 4 which initiates generation of the ring.

9. The computer continues the scanning of all terminals to effectuate additional linkages and also to monitor a change in status of terminal T-45 on loop 4 (from on-hook to off-hook) and for a change in status of terminal T-23 on loop 2 (from off-hook to on-hook).

10. The subscriber on terminal T-45 on loop 4 "answers" by picking up his hand set, causing the status to change from on-hook to off-hook.

11. This change is detected by the computer and conversation paths that were previously reserved are now used to establish the conversation. The stored program computer transfers information to loop controller 2, memory word 8 and places in the A address portion the address of terminal T-23 and, in the B address portion, the remote bit and the address of loop controller 4, memory word 15. The computer also causes the transfer of information to loop controller 4, memory word 15, where the address of terminal T-45 is entered into the A address portion, the remote bit and address of controller 2, and memory word 8 is placed in the B address. Thus the interloop communication path is established.

12. The computer continues the scanning of terminals for change in hook switch status. For this particular call established for terminals T-23 and T-45, the computer monitors to detect an off-hook to on-hook change at either terminal.

13. Assuming the computer detects that terminal T-23 has changed to the on-hook state, the computer then causes memory word 8 in loop controller 2 and memory word 15 in loop controller 4 to be cleared. The computer also up-dates the program tables to show that loop 2 memory word 8, and loop 8 memory word 15, as well as terminal T-23, are all idle, and marks terminal T-45 on loop 4 as still off-hook.

14. The computer then detects when terminal T-45 on loop 4 is on-hook and designates the terminal idle in the memory status table, and thus the housekeeping of the call is completed.

Generalized formulas of various parameters for the herein described embodiment are presented below. These formulas may be used to implement systems with different parameters than those used for illustration above.

1. The overlap function, corresponding to the number of frames occurring between the use of a memory word for an A address and the use of the same memory word for the B address, is used to establish the maximum delay time and, as a result, the allowed length of a loop. In order that the memory addressing scheme used in the loop controller be regular, the number of overlap frames is constrained to be a power of 2, i.e., equal to $2^n$, where the overlap constant $n$ is an integer (e.g. 2). A binary count signal corresponding to the current frame count is maintained for processing by the loop controller, and its format is as follows:

$$X, A/B, Y \tag{1}$$

where

X = the group number in binary form;

A/B = the bit indicating A or B service;

Y = the frame number in binary form within a group (Y is comprised of $k$ bits to specify which frame is being used in an A or B service, e.g. 2 bits).

In the above described embodiment, the overlap constant $n$ is 2 (for four overlap frames) and the number of groups is eight. Thus the binary frame count format consists of 6 bits; the 3 most significant bits for the group number X, the 2 least significant bits for the frame number Y, and the remaining intermediate for the A/B service.

2. The number of frames $N_f$, in a given system, is derived from the formula:

$$N_f = G \times 2^{n+1} \tag{2}$$

where $G$ = number of groups $n$ = overlap constant.

In the described embodiment, the number of groups is five, and the overlap constant $n$ is 2, so that the number of frames $N_f$ is 40.

3. The number of conversations $c$ in a loop is equal to the difference between the total number of frames and the number of control frames required for the loop divided by the number of frames required for a conversation. Thus, for the herein described embodiment:

$$c = (N_f - 2)/2 = 19 \tag{3}$$

Figure 9:
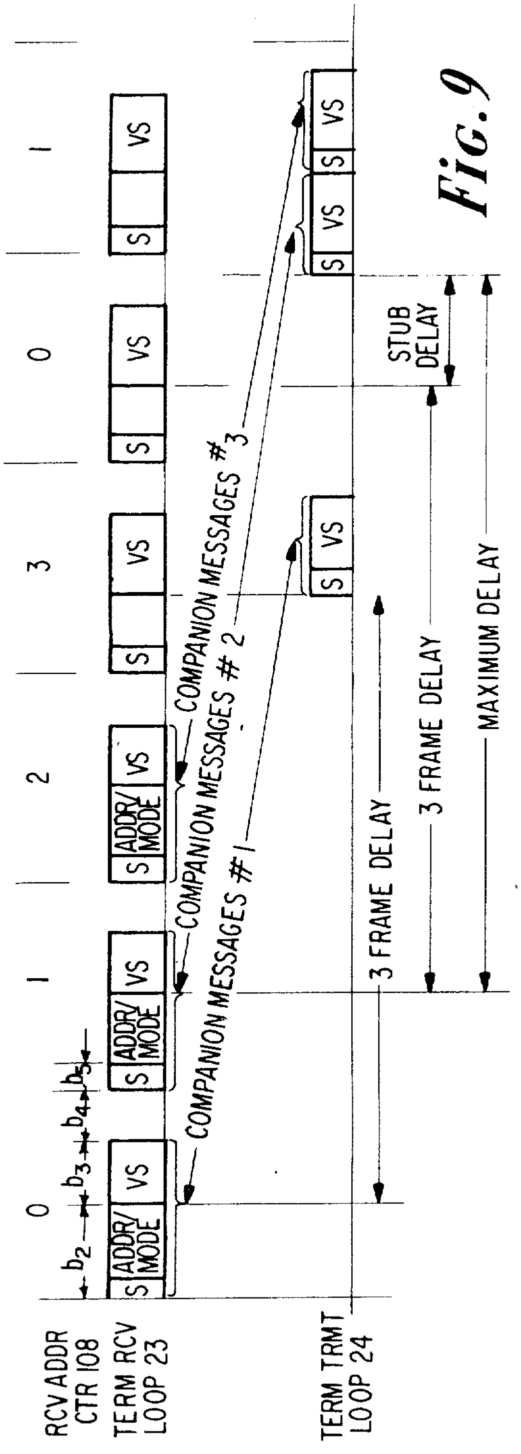
FIG. 9 is a schematic and idealized graphical diagram showing various time relations in the operation of the system of FIG. 1.

4. The data rate on the terminal receive loop 23, $d_r$:

$$d_r = N_f \times r\,(b_2 + b_3 + b_4) \tag{4}$$

where $b_2$ = number of bits in sync, address and mode (e.g. 11) (FIG. 9);

$b_3$ = number of bits in the data or voice samples of a message. In a voice system, $b_3$ is the number of bits in a voice sample (e.g. 6) multiplied by the number of samples in a message (e.g. three) (FIG. 9);

$b_4$ = number of guard bits between transmission to the loop 23 (e.g. 2) (FIG. 9);

$r$ = the rate at which a terminal must be addressed. In a voice system, $r$ equals the required sampling rate (e.g. 8000 per second) divided by the number of samples in a message (e.g. three).

For these parameters, the data rate is approximately 3.8 megabits per second.

5. The maximum loop length $l_{max}$ may be determined for two types of embodiments: (1) a system wherein all terminals are connected directly on the communication loop and (2) a system wherein some or all of the terminals may be connected to the loop via cable stubs (see FIG. 3) of maximum length, $l_{stub}$. These formulas for loop length may be more fully understood by reference to FIG. 9, which shows the message signals on the terminal receive loop 23 as received at the receiver section 26 of a loop controller, and the corresponding frame number output of receive address counter 108. Also shown are the terminal reply message signals on terminal transmit loop 24 in the corresponding time relation of said signals being received at the same receive section 26. As described for the hereinabove discussed embodiment, the reply message from a terminal is nominally delayed three frame periods from the voice sample portion of the companion message received by that terminal. FIG. 9 shows three successive messages on receive loop 23 and the corresponding three companion reply messages on transmit loop 24.

In the case where all terminals are connected directly on a loop, the relationship of companion messages No. 2 (shown in FIG. 9) represents the relative timing of all companion messages on a loop of maximum length. The maximum loop length $l_{max}$ for such a system is:

$$l_{max} = [(b_2 + b_3 + b_4)\ (2^n - 1) + (b_2 + b_4 - b_s)]/d_r \quad (5)$$

where $b_2 + b_3 + b_4$ = the total number of bits in a frame (FIG. 9)

$b_2 + b_4 - b_s$ = the difference between the frame bits and the message bits, $n$ = *overlap constant*, $b_2$ = number of bits in the sync pattern S (e.g. 2)

$d_r$ = data rate, $l_{max}$ = maximum loop length in seconds of transmission delay. (Physical length is dependent on propagation constant of cables and amplifier delays.)

For the parameters described in connection with equation (4), $l_{max}$ equals 31.5 microseconds.

The case where some or all terminals may be connected to the loop via a stub is indicated by the three sets of companion messages shown in FIG. 9, where companion messages No. 1 and No. 3 represent a terminal connected on a maximum length stub to the loop. In order that no two terminal transmit signals overlap, the maximum stub length $l_{stub}$ is equal to the one way propagation delay along the stub divided by the data rate:

$$l_{stub} = (b_2 + b_4 - b_s)/d_4 \quad (6)$$

For a loop having stubs of length $l_{stub}$, the maximum loop length is constrained to be:

$$l_{max} = [(b_2 + b_3 + b_4)\ (2^n - 1)]/d_r$$

in order that the stub terminal's message not overlap with an adjacent message from a terminal connected directly on the loop.

In the hereinabove discussed embodiment, the communication system may be defined in terms of the following parameters:

| | |
|---|---|
| Maximum number of conversations (or memory words) per loop | = 19 |
| Number of sync bits per frame | = 2 |
| Number of address and mode bits per frame | = 9 |
| Number of guard bits per frame | = 2 |
| Number of bits per voice sample | = 6 |
| Number of voice samples per frame | = 3 |
| Total number of voice sample bits per frame | = 18 |
| Total number of bits per frame | = 31 |
| Sampling rate | = 8,000 per sec. |

From the foregoing parameters, the number of frames for a cycle of loop operations, $N_f$, may be determined from equation (3) above to be equal to 40. From equation (4), the data rate $d_r$ may be calculated to be 3.3 megabits per second. From the data rate $d_r$, and the total number of bits per frame, the duration of the frame period equals 9.3 microseconds for the system defined by the above parameters.

Using these parameters and calculated values for a multi-loop communication system, the number of such loop controllers that may be interconnected depends on the speed of operation of interloop transfer system 17, as will now be shown.

In a multi-loop configuration where loop controllers described by the above parameters may be interconnected, there are required to be two interloop message transfers per interloop conversation during every cycle of 40 frames of loop controller operation. In the case where, for example, five loop controllers are interconnected, as many as four of the loop controllers may transfer an interloop message signal to the fifth loop controller in any one frame period (corresponding to a case where one temrinal on each of said four loops may be respectively linked with four terminals on the fifth loop). Similarly, for the general case of $n$ interconnected loop controllers, the maximum required rate of transfers per frame, $m$, equals $n - 1$. Since any frame (A or B service) can receive an interloop transfer message but only a B service frame can effectuate an interloop transfer, then the maximum number of interloop transfers that may be accommodated for a 40-frame cycle of loop control operation is equal to the product of the number of frames in which B service may be performed by a loop controller and the maximum number of required transfers per frame. In the case where, for example, all of the interconnected loop controllers are synchronized in a manner so that all A service frames of said loop controllers occur in a first set of 20 common frame periods per cycle, and therefore all B service frames occur during a second set of 20 time periods per cycle, then the maximum number of interloop transfers that may be accommodated in the 40-frame cycle equals 20 ($n - 1$). However, the efficiency of such a system may be improved in the case where the interconnected loop controllers are synchronized in a manner so that one-half of the loop controllers have their A service frames occur in a first set of 20 common frame periods per cycle while the other half have their respective B frames occur in that same first set; similarly, during a second set of 20 frame periods, the first half of said loop controllers perform B service while said second half perform A service. In such a synchronization pattern, during all points in time, one-half of the loop controllers are in B service frames and thus may effectuate an interloop transmission and there may be 40 $(n-1)$ transfers per 40-frame loop controller cycle. Thus, to transfer the same information as in the first case, the effective maximum required rate of transfers per frame $m'$ is equal to $(n-1)/2$. Thus, for the case of five interconnected loop controllers, the maximum required number of transfers per frame $m'$ is equal to 2, for a system where one-half the interconnected loop controllers are synchronized to have out of phase A and B service periods with respect to the other one-half of the loop controllers.

As may be seen from FIG. 12, one frame period is equivalent to the following:

$$1 \text{ frame period} = T_1 + T_2 + T_4' + T_3 + m'T_4$$

where $m' = (n-1)/2$ and memory access periods $T_1$, $T_2$ and $T_4'$ are equal. In an embodiment where the memory access time $T_1$ $(=T_2= T_4')$ = 60 nanoseconds, and where the transfer time from hold register 215 to system 17, $T_3$ = 300 nanoseconds, and the frame period = 9.3 microseconds, the following relationship is true:

$$(n-1)\,T_4 = 17.6 \text{ microseconds.}$$

Thus the number of loop controllers $n$, which may be interconnected for interloop operation, becomes a function of the speed of operation of transfer system 17 (as measured by the required transfer period $T_4$). For example, if the transfer time $T_4$ required by system 17 equals 4 microseconds, and since $n$ must be an integer, then the maximum number of interconnected loop controllers $n$ equals 5, and thus, in such a system, the number of transfer periods $T_4$ per frame $m'$ equals 2.

The embodiments of the invention described herein with respect to FIGS. 6 and 11 use a memory word to contain two terminal addresses, either those of terminal A and terminal B in the same loop controller, or that of terminal A and an address of another controller for a remote terminal B therein. In addition, each such memory word contains voice samples or data in the state of transmission from terminal A to terminal B or from terminal B to terminal A. Thus, a single memory word is required for each two way intraloop conversation path, and for interloop operation one such word in each loop controller. The invention may also be configured so that the memory word is confined to contain a terminal address at one terminal, the address of another memory word in the same or another controller (which contains the terminal address of the second terminal) and data in the process of transmission to the first terminal. In such an embodiment, each two-way conversation path, intraloop or interloop, requires two memory words. The operation of the loop controller is the same as has already been discussed for data being transmitted to a terminal on the loop. That is, the terminal address and data in, say, the first memory word are transmitted on the loop to the addressed terminal. However, when the reply from the terminal is received by the loop controller, the second set of address information bits (the address of the second memory word) in that first memory word is used to determine the destination for the reply. That is, the reply data received from the terminal on the loop is stored in the memory of the same controller in the second memory word, or transmitted to a remote controller memory for storage in the identified second memory word there, in either case as directed by the second set of address information bits. Although this type of embodiment uses twice as much memory as the embodiment described herein, logic control and the loop transfer system may be considerably simplified. In addition, such an embodiment, which contains two memory words for each conversation path, permits the maximum amount of loop interconnection. That is, a conversation between a terminal on one loop and a terminal on another loop requires only one-half a conversation path in each loop; that is, only one memory word in each of the two loop controllers is required, and that word is used to store only the data to be transmitted in its own loop. Whereas in the interloop embodiment described herein with respect to FIG. 15, a conversation between a terminal on one loop and a terminal on another loop requires one complete conversation path in each loop controller; that is, both memory words in the two loops are used to store the data going in opposite directions.

The above described digital communication system is suitable for a wide variety of communication applications and with a mixture of terminals operating with different forms of digital and analog signals. Installation of the individual terminals to a loop is a relatively simple wiring task. The terminals are readily connected at any location along a loop, and readily disconnected and relocated as circumstances may required. Multi-loop systems may be provided to meet varied needs, and the interloop transfer system interconnects a plurality of individual loops into an integrated system. Each of the loops of such a multi-loop system may be optimally designed to meet the parameters of a particular installation.

This invention is not limited to the above described forms, and other forms and modifications will be apparent to those skilled in the art from the above description. For example, the loop signal path may be constructed as a single line pair used for both transmitting and receiving. That is, messages are transmitted to a terminal from the loop controller on the same line that reply messages are received from that terminal. For this purpose, the controller-transmitted messages may be multiplexed with the reply messages by using separate modulated carriers for the two types of messages.

What is claimed is:

1. A digital communication system for a plurality of transmitting and receiving terminals connected to a loop signal path, said system comprising the steps of:

transmitting in a certain sequence on said loop path at regular time periods digital messages to be received by said terminals in said sequence and having data words and identifying addresses individually associated with said terminals, receiving from said loop path digital reply messages transmitted by said terminals, and storing said reply messages in association with said identifying addresses for subsequent transmitting to said terminals in said sequence, and linking certain terminals for intercommunication including changing the setting of said sequence of terminals that receive said digital messages, and repeating a substantial number of times for each sequence setting the operational cycle of said transmitting, receiving and storing steps.

2. A digital communication system as recited in claim 1 and further comprising the steps by each of said terminals of:

recognizing an associated identifying address in said digital messages for accepting from said loop path those of said digital messages having the associated address, and transmitting on said loop path reply messages.

3. A digital communication system as recited in claim 2 and further comprising the steps by said terminals of converting voice signals to digital signals and digital signals to voice signals.

4. A digital communication system having at least one loop signalling system, each comprising:

a loop signal path;

a plurality of transmitting and receiving terminals connected to said loop path;

and a loop controller for linking said terminals, including means for transmitting to said terminals sequentially on said loop path at regularly repeated assignable time periods digital messages having data words and identifying addresses individually associated with said terminals, for assigning said time periods, and for storing in association with said identifying addresses reply messages for said terminals until transmitted at the time periods associated with the addressed terminals.

5. A digital communication system as recited in claim 4 wherein said terminals include:

means for recognizing an associated identifying address in said messages on said loop path and for accepting those of said digital messages having the associated identifying address;

and means for developing and transmitting reply messages.

6. A digital communication system as recited in claim 5 wherein said terminals include digital to analog and analog to digital converting means for said means for accepting said digital messages and said means for developing and transmitting reply messages.

7. A digital communication system as recited in claim 4 and having a plurality of said loop signal systems, and means for transferring said digital and reply messages between the loop controllers of said loop signal systems.

8. A digital communication system comprising:

a loop signal path, a plurality of transmitting and receiving terminals connected to said loop path, each of said terminals having means for developing message words of digital signals and for transmitting said message words on said loop path in a certain time relation to signals accepted from said loop path, and means connected to said loop path for recognizing an associated digital address and for accepting message words transmitted with said address;

and a loop controller including digital memory means having sections for storing words respectively associated with a plurality of said terminals, said stored words including said message words and being identified by digital addresses associated with each terminal, means for receiving message words transmitted by each of said terminals and for storing said words in the associated memory section, and means for transmitting said associated addresses and corresponding message words on said loop path during certain regular time periods individually associated with said terminals.

9. A digital communication system as recited in claim 8 wherein said loop signal path includes separate signal loops for transmitting said message words respectively from said terminals to said loop controller and from said loop controller to said terminals.

10. A digital communication system as recited in claim 8 wherein said message words include digitized voice signals and digital control signals.

11. A digital communication system as recited in claim 8 wherein said loop controller includes means for setting the time periods during which certain stored words in the memory section are transmitted on said loop.

12. A digital communication system for concurrent transmission between a plurality of terminals to be linked in groups for intercommunication, each of said terminals having transmitting and receiving sections, said system comprising:

a loop signal path;

a plurality of said terminals connected in parallel to said loop path;

and a loop controller connected to said loop path for controlling the linking of said terminals, and including means for transmitting individual digital messages to said terminals sequentially on said loop path at regularly repeated assignable time periods respectively associated with different ones of said terminals over each of a plurality of successive time cycles, and for receiving reply messages from said terminals in time periods different from the transmitting time periods, and means for storing said reply messages until transmitted at the respective transmitting time periods and for assigning said time periods to link said terminals in groups for intercommunication.

* * * * *